US012035116B2

(12) United States Patent
Park et al.

(10) Patent No.: US 12,035,116 B2
(45) Date of Patent: Jul. 9, 2024

(54) ELECTRONIC DEVICE INCLUDING SPEAKER AND MICROPHONE

(71) Applicant: Samsung Electronics Co., Ltd., Suwon-si (KR)

(72) Inventors: Haekeu Park, Suwon-si (KR); Juhee Chang, Suwon-si (KR); Hyeonyeong Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 17/685,817

(22) Filed: Mar. 3, 2022

(65) Prior Publication Data

US 2022/0345816 A1 Oct. 27, 2022

Related U.S. Application Data

(63) Continuation of application No. PCT/KR2022/002881, filed on Feb. 28, 2022.

(30) Foreign Application Priority Data

Apr. 23, 2021 (KR) ........................ 10-2021-0053298
Oct. 8, 2021 (KR) ........................ 10-2021-0133954

(51) Int. Cl.
*H04R 3/02* (2006.01)
*H04R 1/10* (2006.01)
(Continued)

(52) U.S. Cl.
CPC ............ *H04R 3/02* (2013.01); *H04R 1/1075* (2013.01); *H04R 1/1083* (2013.01); *H04R 1/26* (2013.01); *H04R 3/14* (2013.01); *H04R 1/1016* (2013.01)

(58) Field of Classification Search
None
See application file for complete search history.

(56) References Cited

U.S. PATENT DOCUMENTS 10,827,249 B1 * 11/2020 Pine ..................... H04R 1/1041
2014/0205131 A1 7/2014 Azmi et al.
(Continued)

FOREIGN PATENT DOCUMENTS

CN 110099323 A 8/2019
JP 2007-201887 A 8/2007
(Continued)

OTHER PUBLICATIONS

English language translation of WO 2020/255596 A1. (Year: 2020).*
(Continued)

*Primary Examiner* — Paul W Huber
(74) *Attorney, Agent, or Firm* — Jefferson IP Law, LLP

(57) ABSTRACT

A wearable electronic device is provided. The wearable electronic device includes a speaker and a microphone, and more particularly, to a wearable electronic device worn on the user's ear. Various embodiments of the disclosure may provide a wearable electronic device including a first speaker configured to radiate a sound in a first frequency range, a second speaker configured to radiate a sound in a second frequency range higher than the first frequency range, a microphone, and a housing configured to accommodate the first speaker, the second speaker, and the microphone therein. The housing may include a sound path configured to serve as a path through which sounds radiated from the first speaker and the second speaker move, and a recess configured to communicate the sound path with the outside of the housing.

23 Claims, 15 Drawing Sheets

(51) Int. Cl.
*H04R 1/26* (2006.01)
*H04R 3/14* (2006.01)

(56) References Cited

U.S. PATENT DOCUMENTS

| | | | |
|---|---|---|---|
| 2017/0318401 | A1 | 11/2017 | Chang et al. |
| 2017/0358291 | A1 | 12/2017 | Cheng et al. |
| 2019/0019491 | A1 | 1/2019 | Kumar et al. |
| 2020/0084535 | A1 | 3/2020 | Perkmann et al. |
| 2020/0251086 | A1 | 8/2020 | Tobise et al. |
| 2021/0176557 | A1 | 6/2021 | Schreuder |
| 2022/0248126 | A1 | 8/2022 | Hasegawa |

FOREIGN PATENT DOCUMENTS

| | | | |
|---|---|---|---|
| JP | 2015-061115 | A | 3/2015 |
| KR | 10-1092958 | B1 | 12/2011 |
| KR | 10-2017-0123818 | A | 11/2017 |
| KR | 10-2021-0041572 | A | 4/2021 |
| WO | 2007/086360 | A1 | 8/2007 |
| WO | 2017/122091 | A1 | 7/2017 |
| WO | 2020/255596 | A1 | 12/2020 |

OTHER PUBLICATIONS

International Search Report and Written Opinion dated Jun. 9, 2022, issued in International Patent Application No. PCT/KR2022/002881.
European Search Report dated May 24, 2023, issued in European Patent Application No. 22709545.2.

* cited by examiner

300

ELECTRONIC DEVICE INCLUDING SPEAKER AND MICROPHONE

CROSS-REFERENCE TO RELATED APPLICATION(S)

This application is a continuation application, claiming priority under § 365(c), of an International application No. PCT/KR2022/002881, filed on Feb. 28, 2022, which is based on and claims the benefit of a Korean patent application number 10-2021-0053298, filed on Apr. 23, 2021, in the Korean Intellectual Property Office, and of a Korean patent application number 10-2021-0133954, filed on Oct. 8, 2021, in the Korean Intellectual Property Office, the disclosure of each of which is incorporated by reference herein in its entirety.

TECHNICAL FIELD

The disclosure relates to an electronic device including a speaker and a microphone.

BACKGROUND ART

An electronic device may have at least one component related to sound effects mounted therein. Components related to sound effects may include, for example, a speaker and a microphone, and such components may be mounted inside the housing of the electronic device so as to have various formats and disposition structures so as to correspond to the exterior design of the electronic device, which is variously designed.

Examples of electronic devices including a speaker and a microphone include wearable electronic devices which can be worn on parts adjacent to users' ears, such as in-ear earphones (or earsets) or hearing aids. The microphone disposed inside the housing of such a wearable electronic device may be provided to perform an active noise cancellation (ANC) function. The ANC function may refer to a function for receiving a sound-related wave by using a microphone, inversing the phase of the wave, and outputting the phase-inverted wave through a speaker, thereby blocking noise. By performing the ANC function, noise generated inside or outside of the wearable electronic device may be removed through destructive interference.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

A wearable electronic device may have various acoustic components and electronic components disposed in a single housing. When a wearable electronic device including a microphone in a sound path is mounted and used in a user's ear, the microphone may collect sound waves emitted from a speaker or sound waves reflected inside the ear in order perform an active noise cancellation (ANC) function. However, in the case of a conventional wearable electronic device, if a microphone is disposed in a path of sound output from a speaker that emits high sound ranges, a peak signal may be input to a speaker-microphone response, and this may degrade the ANC performance. Such a peak signal in a high sound range may not operate in connection with relatively implementing the ANC function in a low sound range (for example, frequency band of 2 kHz or less), thereby causing a problem such as howling.

Aspects of the disclosure are to address at least the above-mentioned problems and/or disadvantages and to provide at least the advantages described below. Accordingly, an aspect of the disclosure is to provide a wearable electronic device having an improved acoustic performance, in view of acoustic characteristics that vary depending on disposition relation between acoustic components including a speaker and a microphone and disposition of a channel connect to the speaker and the microphone.

Another aspect of the disclosure is to provide a wearable electronic device including a microphone mounting structure according to various embodiments for reducing an influence from high-sound-range characteristics (for example, peak signal) of a speaker.

Additional aspects will be set forth in part in the description which follows and, in part, will be apparent from the description, or may be learned by practice of the presented embodiments.

Technical Solution

In accordance with an aspect of the disclosure, a wearable electronic device is provided. The wearable device includes a first speaker configured to radiate a sound in a first frequency range, a second speaker configured to radiate a sound in a second frequency range higher than the first frequency range, a microphone, a housing configured to accommodate the first speaker, the second speaker, and the microphone therein, the housing including a sound path extending in the first direction and configured to serve as a path through which sounds radiated from the first speaker and the second speaker move, and a recess configured to communicate the sound path with the outside of the housing, wherein the microphone is disposed at a position where, when the recess is viewed from above, the microphone overlaps with the first speaker in a first direction and does not overlap with the second speaker in the first direction.

In accordance with another aspect of the disclosure, a wearable electronic device is provided. The wearable device includes a first speaker configured to radiate a sound in a first frequency range in a first direction, a second speaker configured to radiate a sound in a second frequency range higher than the first frequency range in a direction parallel to the first direction, a microphone, a housing configured to accommodate the first speaker, the second speaker, and the microphone therein, the housing including a sound path extending in the first direction and configured to serve as a path through which sounds radiated from the first speaker and the second speaker move, and a recess configured to communicate the sound path with the outside of the housing, wherein the microphone is disposed in the sound path, and a sound receiver of the microphone is formed to face in a direction different from the first direction.

Advantageous Effects

According to various embodiments of the disclosure, when an ANC function is implemented by using a feedback microphone, in connection with a wearable electronic device including a multi-way speaker, the relative disposition between the speaker and the feedback microphone may be optimized, thereby reducing sounds in a high sound range entering the feedback microphone, and improving ANC performance.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR CARRYING OUT THE INVENTION

Figure 1:
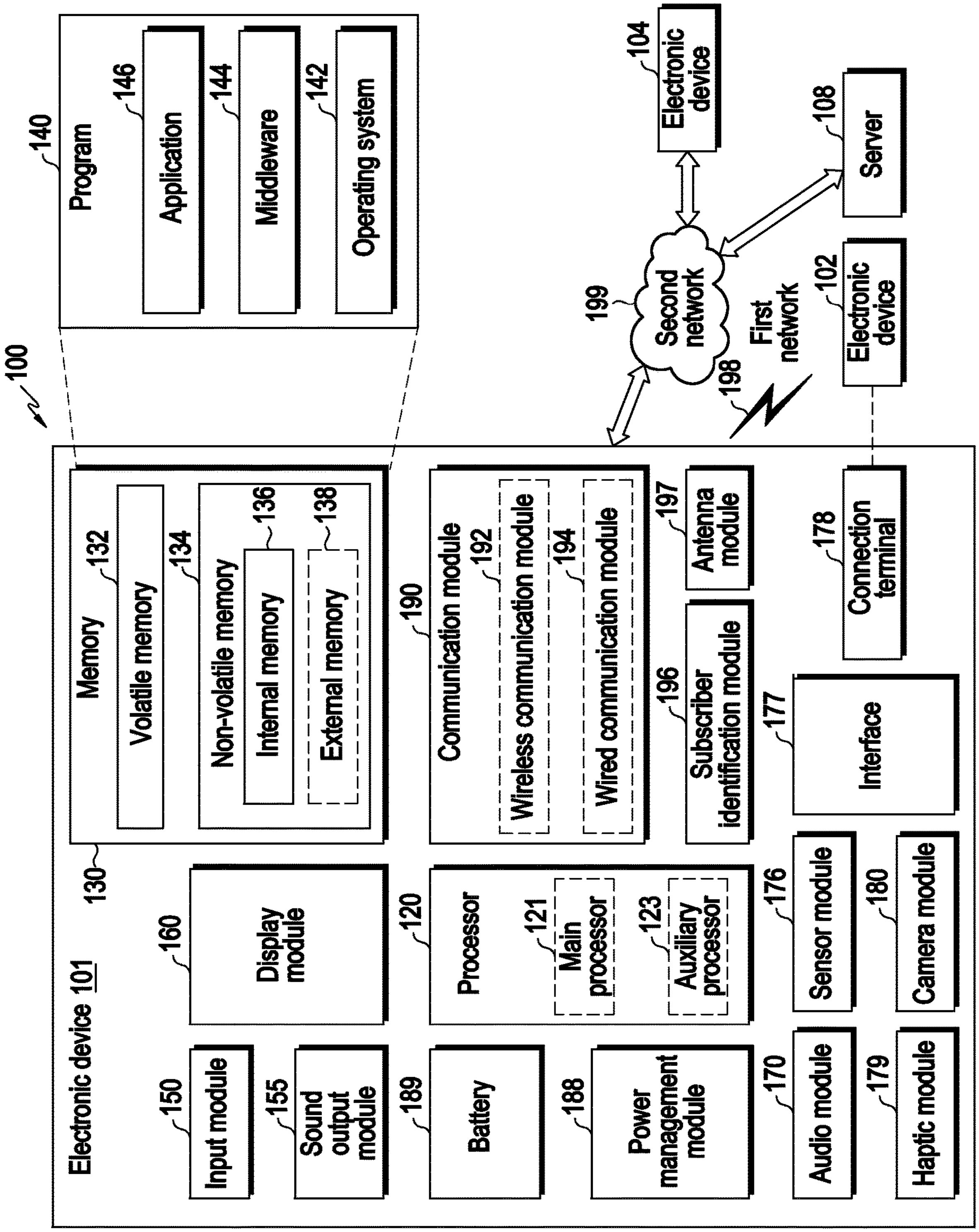
FIG. 1 is a block diagram of an electronic device in a network environment, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those or ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before various embodiments of the disclosure are described in detail, it will be understood that the application is not limited to the details of the configuration and arrangement of elements included in the following detailed description or shown in the drawings.

In addition, it will be understood that when an element is referred to as being "connected" or "coupled" to another element, it can be directly connected or coupled to said another element or intervening elements may be present. In addition, "connection" herein includes direct connection and indirect connection between one member and another member and may refer to all physical connections and electrical connections such as adhesion, attachment, fastening, bonding, binding, and the like.

Terms used in the disclosure are only used to describe specific embodiments, and are not intended to limit the disclosure. In the disclosure, it should be understood that the terms such as "comprise" or "have" are intended to specify the presence of a feature, number, operation, element, component, or a combination thereof described in the specification, but do not preclude the presence or addition of one or more other features numbers, operations, elements, components, or a combination thereof.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
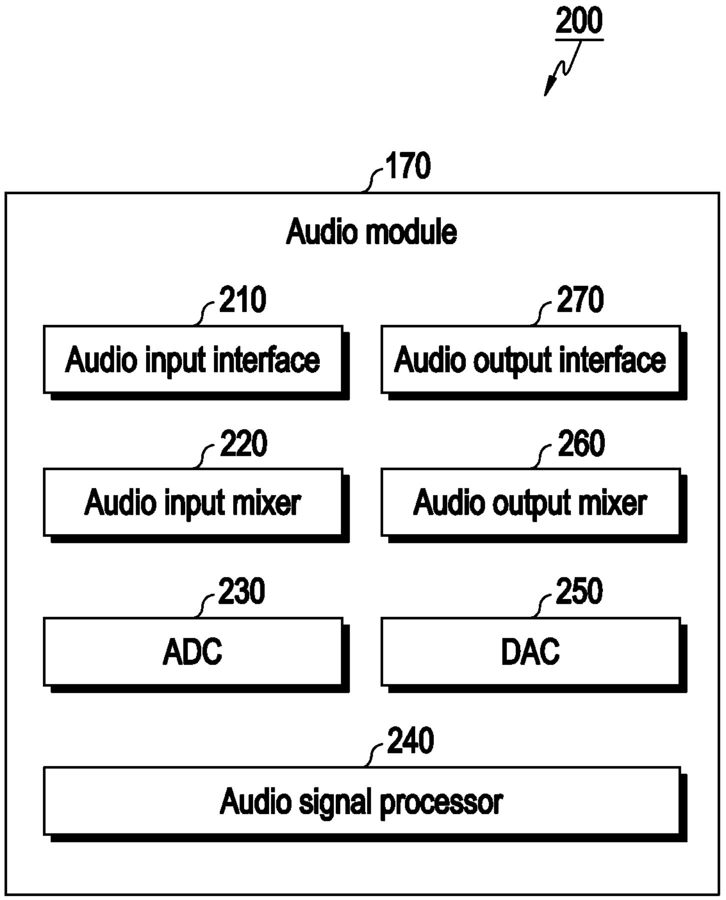
FIG. 2 is a block diagram of an audio module according to an embodiment of the disclosure.

FIG. 2 is a block diagram of an audio module, according to an embodiment of the disclosure.

Referring to FIG. 2 depicting a block diagram 200 of an audio module 170, the audio module 170 may include, for example, an audio input interface 210, an audio input mixer 220, an analog to digital converter (ADC) 230, an audio signal processor 240, and a digital to analog converter (DAC) 250, an audio output mixer 260, or an audio output interface 270.

The audio input interface 210 as part of an input module 150 may receive an audio signal corresponding to a sound acquired from the outside of an electronic device 101 through a microphone (e.g., a dynamic microphone, a condenser microphone, or a piezo microphone) configured separately from the electronic device 101. For example, when an audio signal is acquired from the external electronic device 102 (e.g., a headset or a microphone), the audio input interface 210 is connected to the external electronic device 102 directly through a connection terminal 178 or wirelessly (e.g., via Bluetooth communication) through a wireless communication module 192 to receive an audio signal. According to one embodiment, the audio input interface 210 may receive a control signal (e.g., a volume adjustment signal received through an input button) related to an audio signal acquired from the external electronic device 102. The audio input interface 210 may include a plurality of audio input channels and may receive a different audio signal for each corresponding audio input channel, among the plurality of audio input channels. According to one embodiment, additionally or alternatively, the audio input interface 210 may receive an audio signal from another element (e.g., the processor 120 or the memory 130) of the electronic device 101.

The audio input mixer 220 may synthesize a plurality of input audio signals into at least one audio signal. For example, according to one embodiment, the audio input mixer 220 may synthesize a plurality of analog audio signals input through the audio input interface 210 into at least one analog audio signal.

The ADC 230 may convert an analog audio signal into a digital audio signal. For example, according to one embodiment, the ADC 230 may convert an analog audio signal received through the audio input interface 210 or additionally or alternatively, an analog audio signal synthesized through the audio input mixer 220 into a digital audio signal.

The audio signal processor 240 may perform various processing on the digital audio signal input through the ADC 230 or the digital audio signal received from other elements of the electronic device 101. For example, according to one embodiment, changing a sampling rate, applying one or more filters, interpolation, amplifying or attenuating the entire or partial frequency band, noise treatment (e.g., noise or echo reduction), changing a channel (e.g., switching between mono and stereo), mixing, or extracting a specified signal may be performed on one or more digital audio signals by the audio signal processor 240. According to one embodiment, one or more functions of the audio signal processor 240 may be implemented in the form of an equalizer.

The DAC 250 may convert a digital audio signal into an analog audio signal. For example, according to one embodiment, the DAC 250 may convert a digital audio signal processed by the audio signal processor 240, or a digital audio signal acquired from another element (e.g., the processor 120 or the memory 130) of the electronic device 101 into an analog audio signal.

The audio output mixer 260 may synthesize a plurality of audio signals to be output into at least one audio signal. For example, according to one embodiment, the audio output mixer 260 may synthesize an audio signal converted into analog through the DAC 250 and another analog audio signal (e.g., an analog audio signal received through the audio input interface 210) into at least one analog audio signal.

The audio output interface 270 may output an analog audio signal converted through the DAC 250 or additionally or alternatively an analog audio signal synthesized by the audio output mixer 260 to the outside of the electronic device 101 through the sound output module 155. The sound output module 155 may include, for example, a speaker, such as a dynamic driver or a balanced armature driver, or a receiver. According to one embodiment, the sound output module 155 may include a plurality of speakers. In this case, the audio output interface 270 may output an audio signal having a plurality of different channels (e.g., stereo or 5.1 channel) through at least specific speakers of the plurality of speakers. According to one embodiment, the audio output interface 270 may be connected to the external electronic device 102 (e.g., an external speaker or a headset) directly through the connection terminal 178 or wirelessly through the wireless communication module 192 to output an audio signal.

According to one embodiment, the audio module 170 may synthesize a plurality of digital audio signals by using at least one function of the audio signal processor 240 to generate at least one digital audio signal, without separately including the audio input mixer 220 or the audio output mixer 260.

According to one embodiment, the audio module 170 may include an audio amplifier (not shown) (e.g., a speaker amplification circuit) capable of amplifying an analog audio signal input through the audio input interface 210 or an audio signal to be output through the audio output interface 270. According to one embodiment, the audio amplifier may be configured as a module separate from the audio module 170.

Figure 3A:
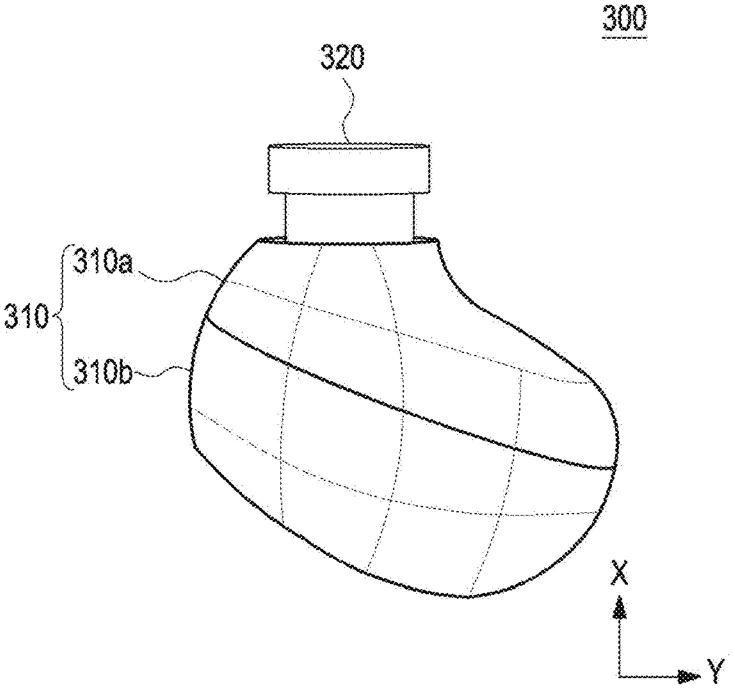
FIGS. 3A, 3B, and 3C illustrate the exterior of a wearable electronic device according to an embodiment of the disclosure.
Figure 3B:
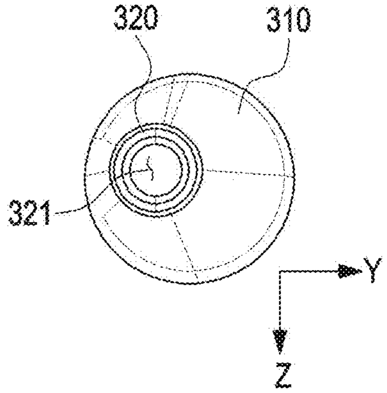
Figure 3C:
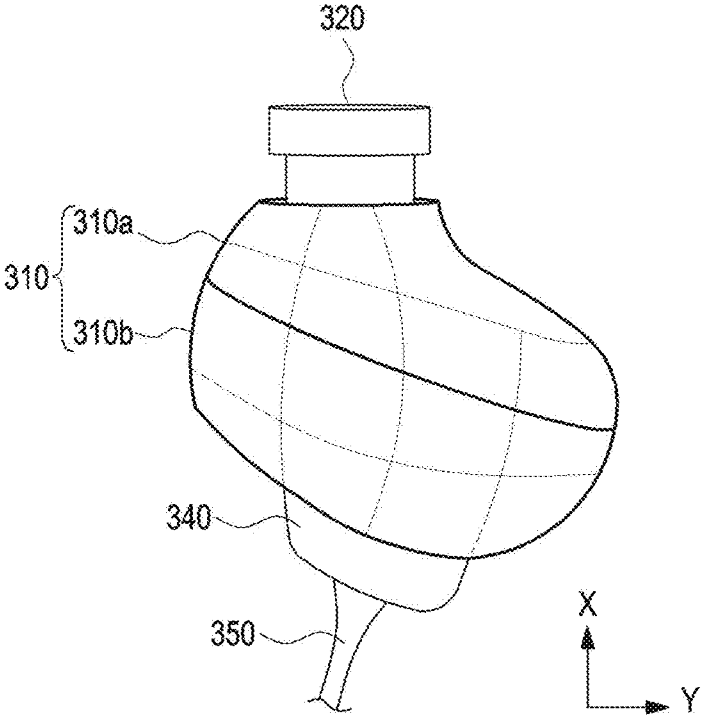

FIGS. 3A, 3B, and 3C illustrate a cross section of a wearable electronic device (e.g., an electronic device of FIG.

1) according to an embodiment of the disclosure. FIG. 3A is the wearable electronic device 300 according to an embodiment of the disclosure, viewed from the side and FIG. 3B is the wearable electronic device 300 according to an embodiment of the disclosure, viewed from above. FIG. 3C illustrates the wearable electronic device 300 connected to a cable 350 according to the embodiment shown in FIG. 3A.

FIGS. 3A, 3B, and 3C show a direction component X, a direction component Y, and a direction component Z. The direction component X, the direction component Y, and the direction component Z may be orthogonal to each other and may form a three-dimensional coordinate system defined by the X axis, the Y axis, and the Z axis. The direction component X may indicate a height direction of the wearable electronic device 300, the direction component Y may indicate a horizontal width direction of the wearable electronic device 300, and the direction component Z may indicate a vertical width direction of the wearable electronic device 300. According to various embodiments of the disclosure, the direction component X may indicate a movement path of a sound radiated from a speaker. For example, in the following description (e.g., the embodiment of FIGS. 5, 6, 7, 8A, 8B, 9, and 10), a first direction which is a movement direction of a sound radiated from a first speaker may refer to the direction component X, and a movement direction of a sound radiated from a second speaker may be defined as being parallel to the first direction.

Referring to FIG. 3A to 3C, the wearable electronic device 300 (e.g., electronic device 101 of FIG. 1) according to various embodiments of the disclosure may include a housing 310 and a protrusion 320. The housing 310 may include an upper housing 310*a* and a lower housing 310*b* which are combined with each other to form a single housing and may form a space for mounting various components therein. For example, acoustic components (e.g., a speaker or a microphone) and electronic components (e.g., a battery, a power management module, a wireless communication module, etc.) may be disposed inside the housing 310.

According to one embodiment, as shown in FIG. 3B, the wearable electronic device 300 may have an asymmetric shape. With regard to the reason that the wearable electronic device 300 has an asymmetric shape, ergonomic factors may be partially considered, but in terms of acoustic performance securement, an arrangement relationship between the acoustic components and the electronic components inside the housing 310 may be preferentially considered.

The wearable electronic device 300 according to various embodiments of the disclosure may correspond to a part of the body, for example, a device that can be worn on the ear or head. The wearable electronic device 300 may include, for example, an in-ear earset (or an in-ear headset) and a hearing aid and may include various product groups to which a speaker or a microphone is mounted, in addition thereto.

In various drawings of the disclosure, as an example of the wearable electronic device 300, a kernel-type in-ear earset mounted on the external auditory meatus connected mainly from the auricle to the eardrum may be described as a target thereof. However, it should be noted that the disclosure is not limited thereto. According to another embodiment, although not shown in the drawings, the wearable electronic device 300 may target an open-type earset mounted on the auricle.

Referring to FIGS. 3A and 3C together, the wearable electronic device 300 (e.g., electronic device 101 of FIG. 1) may be integrated into an electronic device (e.g., 102 of FIG. 1) or be configured separately from an electronic device (e.g., 102 of FIG. 1). Here, the electronic device (e.g., 102 in FIG. 1) may correspond to various types of devices. The electronic device (e.g., 102 of FIG. 1) may include, for example, a smartphone, a mobile phone, a navigation device, a game machine, a TV, a vehicle head unit, a notebook computer, a laptop computer, a tablet computer, and a personal media player (PMP), personal digital assistants (PDAs), a portable communication device, a computer device, a portable multimedia device, a portable medical device, a camera, a wearable device, or various electronics appliances. The electronic device according to the embodiment disclosed herein is not limited to the above-described devices.

The wearable electronic device 300 may be connected to an electronic device (e.g., 102 of FIG. 1) by wire or wirelessly. In this case, in a relationship with the electronic device (e.g., 102 of FIG. 1), the wearable electronic device 300 may serve as an audio output interface (or a sound output module (e.g., sound output module 155 of FIG. 1)) configured to output a sound signal generated by the electronic device (e.g., electronic device 102 of FIG. 1) to the outside. Additionally or alternatively, the wearable electronic device 300 disclosed herein may also serve as an audio input interface (or an input module (e.g., input module 150 of FIG. 1)) for receiving an audio signal corresponding to a sound acquired from the outside of the electronic device (e.g., electronic device 102 in FIG. 1).

Hereinafter, as an example, the wearable electronic device 300 may be provided separately from the electronic device (e.g., 102 of FIG. 1). Accordingly, in the following embodiments, the electronic device (e.g., 102 of FIG. 1) may also be referred to as an "external electronic device (e.g., 102 of FIG. 1)" because it is provided separately from the wearable electronic device 300. Referring to FIG. 3C, the wearable electronic device 300 may be connected to an external electronic device (e.g., 102 of FIG. 1) by wire. In this case, the wearable electronic device 300 may communicate with an external electronic device using a cable 350. As one embodiment different from FIG. 3A, the wearable electronic device 300 may further include a connection part 340 for connecting the cable 350. According to one embodiment, one end of the cable 350 may be connected to the wearable electronic device 300, and the other end of the cable 350 may be connected to a connection terminal (not shown) formed in an external electronic device. Accordingly, the wearable electronic device 300 may be directly connected to the external electronic device.

In a case (e.g., FIG. 3A) where the wearable electronic device 300 is wirelessly connected to an external electronic device (e.g., 102 of FIG. 1), the wearable electronic device 300 may communicate with the external electronic device via a network (e.g., a short-range wireless communication network or a long-distance wireless communication network). The network may include, but is not limited to, a mobile or cellular network, a local area network (LAN) (e.g., Bluetooth communication), a wireless local area network (WLAN), a wide area network (WAN), an Internet, a small area network (SAN), or the like.

The wearable electronic device 300 may include a communication module. The wearable electronic device 300 according to various embodiments may further include at least one of a power management module, a sensor module, a battery, and an antenna module. The communication module in an embodiment in which the wearable electronic device 300 is wirelessly connected to an external electronic device may correspond to a wireless communication module. In addition, the wearable electronic device 300 according to various embodiments may further include an audio module (e.g., audio module 170 of FIG. 1) in addition to the components according to the above-described embodiments, which may be integrated into the housing 310 of the wearable electronic device 300, thereby configuring a compact structure. The audio module (e.g., audio module 170 of FIG. 1) may include, for example, an audio input mixer (e.g., audio input mixer 220 of FIG. 2), an analog to digital converter (ADC) (e.g., ADC 230 of FIG. 2), and an audio signal processor (e.g., audio signal processor 240 of FIG. 2), a digital to analog converter (DAC) (e.g., DAC 250 of FIG. 2), and an audio output mixer (e.g., audio output mixer 260 of FIG. 2). In the description of elements of the audio module included in the wearable electronic device 300, the description overlapping with the embodiment of FIG. 2 will be omitted.

According to one embodiment, the wearable electronic device 300 may not communicate with an external electronic device. In this case, the wearable electronic device 300 may be implemented to receive a signal corresponding to a sound acquired from the outside and output the sound signal to the outside, according to the self-operation (or control) of components included in the wearable electronic device 300, without being controlled through the external electronic device. For example, the wearable electronic device 300 may be a stand-alone type electronic device which autonomously reproduces music or a video without communicating with an external electronic device to output a sound accordingly or to receive and process a user's voice.

According to another embodiment, the wearable electronic device 300 may communicate with and/or be controlled by an external electronic device. The wearable electronic device 300 may be an interaction type electronic device which is paired with an external electronic device such as a smart phone via a communication method such as Bluetooth to convert data received from the external electronic device to output a sound or to receive a user's voice to transmit the sound and the voice to the external electronic device.

Figure 4:
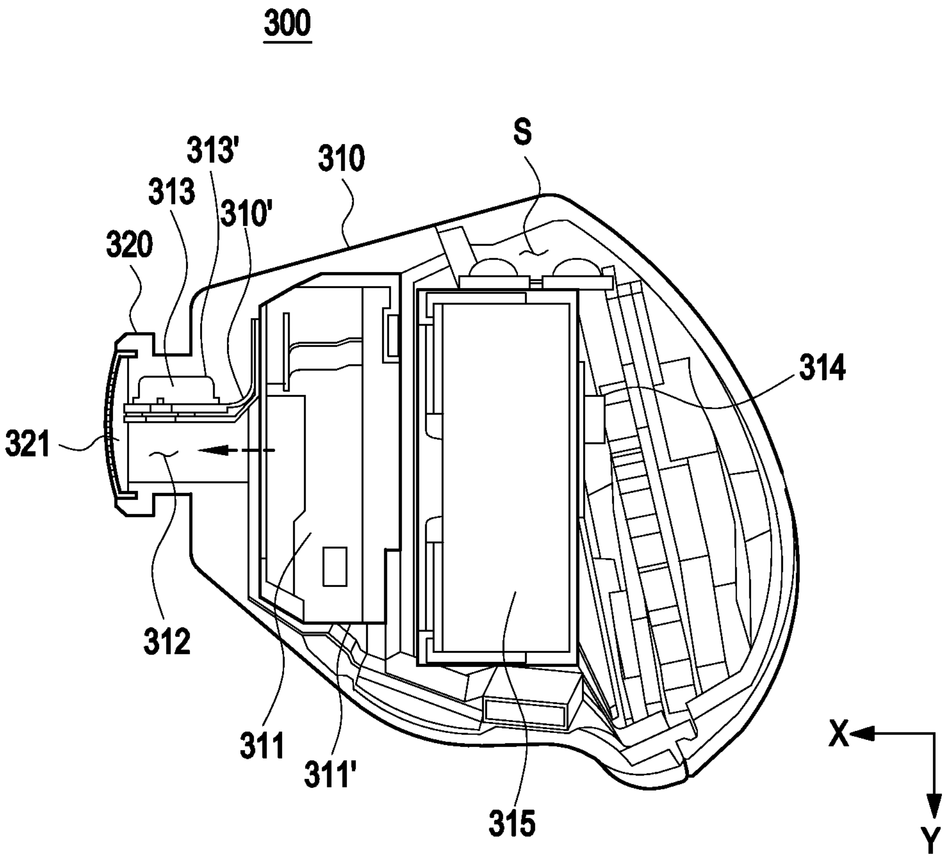
FIG. 4 is a schematic diagram illustrating a cross section of the inside of a wearable electronic device according to an embodiment of the disclosure.

FIG. 4 is a schematic diagram illustrating a cross section of the inside of the wearable electronic device 300 according to an embodiment of the disclosure.

Referring to FIG. 4, the housing 310 may include a protrusion 320 that may be inserted into the user's ear. The protrusion 320 may be a portion coupled to one side of the housing 310 to protrude in one direction therefrom. The wearable electronic device 300 may be inserted into and mounted in at least a part of the body (the external auditory meatus or at least the auricle of the body) using the protrusion 320. The protrusion 320 may further include an ear tip mounted thereon and may come into close contact with at least a portion of the body through the ear tip (not shown) to be further stably supported by at least the portion of the body.

Referring to FIG. 4 together, according to various embodiments, the housing 310 may have a sound path and a recess 321 for communicating the sound path with the outside. For example, the recess 321 may be an opening, aperture, gap, hole, etc. in the housing 310, which enables sound to be output to outside the housing 310.

According to various embodiments of the disclosure, the wearable electronic device 300 may include a speaker 311 as an audio output interface. The speaker 311 may be provided to enable a user to listen to a variety of sound-related information, such as playable music, playable multimedia, and playable recording.

The wearable electronic device 300 may include a microphone 313 as an audio input interface. The microphone 313 may include, for example, a dynamic microphone, a condenser microphone, or a piezo microphone. The wearable electronic device 300 may receive an audio signal corresponding to a sound acquired from the inside or the outside of the wearable electronic device 300 through the microphone 313.

According to one embodiment, the microphone 313 may be a microphone (hereinafter, referred to as an "ANC microphone" for short) for performing an active noise cancellation (ANC) function.

According to one embodiment, the microphone 313 may be disposed in parallel with the speaker 311 in a single housing 310. The outer wall structure of the housing 310 may form an inner space (S) having a predetermined size, and the microphone 313 and the speaker 311 may be disposed on the inner space (S) of the housing 310. According to one embodiment, the speaker 311 may be fitted into the speaker holder 311' configured to accommodate the speaker, and the microphone 313 may be fitted into the microphone holder 313' configured to accommodate the microphone. According to one embodiment, the microphone 313 may also be structured to be bonded and seated on the microphone holder 313'. The microphone 313 may be easily bonded and seated on the microphone holder 313' due to the volume thereof which is smaller than that of the speaker 311.

Referring to FIG. 4, the housing 310 may have a narrow inner space (S) for mounting a component at a position adjacent to a portion (e.g., protrusion) insertable into and mountable on at least a part (the external auditory meatus or at least the auricle of the body) of the body and may have a relatively wide inner space (S) for mounting a component at a position far from the portion (e.g., protrusion) insertable into and mountable on at least a part (the external auditory meatus or at least the auricle of the body) of the body. In describing various embodiments of the disclosure, among components located in the inner space (S) of the housing 310, a component located adjacent to a portion (e.g., the protrusion having the recess 321 formed thereon in FIG. 4 or the grill portion having the recess 501 formed thereon in FIG. 13) insertable into and mountable on at least a part of the body may be referred to as being "located outside the wearable electronic device 300" (even though said component may be part of the wearable electronic device 300) and, in contrast, a component located far from the portion (e.g., the protrusion 320 having the recess 321 formed thereon in FIG. 4 or the grill portion having the recess 501 formed thereon in FIG. 13) insertable into and mountable on at least a part of the body may be referred to as being "located inside the wearable electronic device 300".

The housing 310 may include a sound path 312 configured to serve as a path for guiding a sound radiated from the speaker. According to one embodiment, in the inner space (S) of the housing 310, a portion other than a space for accommodating electronic components including the sound path, the speaker 311, and the microphone 313, may be filled with a designated material (e.g., a resin). According to one embodiment, the inside of the housing 301 may be waterproofed by filling a portion other than the space for accommodating electronic components including the speaker 311 and the microphone 313 with a designated material (e.g., resin). According to one embodiment, a space for accommodating other electronic components including an audio signal processor (e.g., a processor), a board (e.g., a flexible printed circuit board; FPCB), and a battery 315 may be further formed in the inner space (S) of the housing 310. In FIG. 4, the audio signal processor 314 and the battery 315 are illustrated as being installed on a flat portion formed inside the housing 310, but the shape of the inside of the housing 310 and the arrangement of the components are not necessarily limited thereto. According to another embodiment, the housing 310 and the remaining portion inside the housing 310, except for a space for accommodating the sound path 312, the speaker holder 311', the microphone holder 313', and the electronic components, may be substantially formed in a single body (e.g., a mold). According to various embodiments, the detailed arrangement of the components included in the housing 310 may vary according to the embodiments.

The wearable electronic device 300 according to various embodiments of the disclosure may provide a structure configured to secure the ANC performance by reducing a sound in a high sound range entering the microphone 313.

Figure 5:
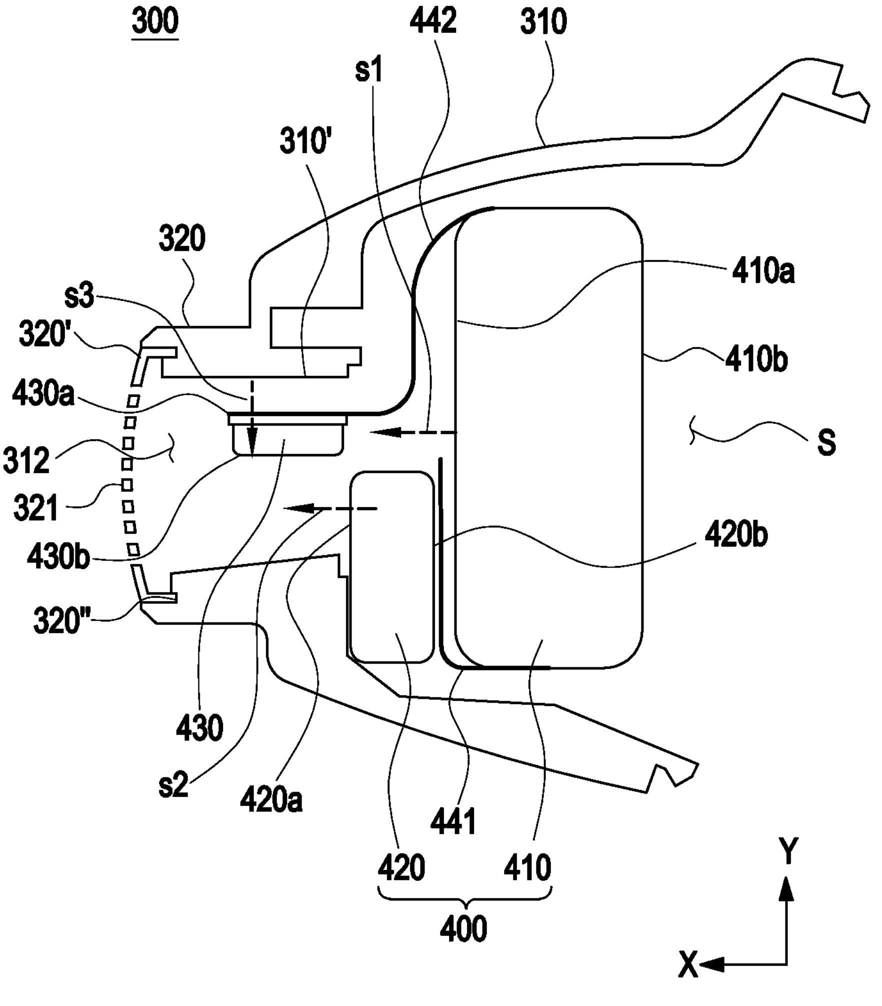
FIG. 5 is a schematic diagram illustrating a cross section of a wearable electronic device in which a speaker and a microphone are disposed, according to an embodiment of the disclosure.

FIG. 5 is a schematic diagram illustrating a cross section of a wearable electronic device in which a speaker and a microphone are disposed, according to an embodiment of the disclosure.

Referring to FIG. 5, a wearable electronic device 300 may include a speaker 400 configured to output a sound in multi-directions (hereinafter, referred to as a "multi-way speaker 400" for short). The multi-way speaker 400 may include, for example, a plurality of speakers physically separated from each other. For example, the wearable electronic device 300 may include a first speaker 410 capable of outputting a sound in a first sound range, and a second speaker 420 capable of outputting a sound in a second sound range higher than the first sound range. According to various embodiments, the wearable electronic device 300 may also include a third speaker capable of outputting a sound between the first sound range and the second sound range, in addition to the first speaker 410 and the second speaker 420, described above, a fourth speaker capable of outputting a sound other than an audible frequency (e.g., 20 Hz-20 kHz), and the like, but the description thereof will be omitted below. As an example, the wearable electronic device 300 may include a woofer configured to radiate a sound (s1) in a relatively low sound range as the first speaker 410, and a tweeter for a sound (s2) in a relatively high sound range as the second speaker 420. The above-described first speaker 410 and second speaker 420 may be implemented as either a dynamic driver or a balanced armature driver, respectively. For example, the first speaker 410 may be configured as a dynamic driver, and the second speaker 420 may be implemented using a balanced armature driver for each of a low sound range and a high sound range. According to one embodiment, the first speaker 410 configured as a dynamic driver may radiate a sound through vibration of a membrane, and the second speaker 420 configured as a balanced armature driver may radiate a sound by moving or vibrating a diaphragm inside the speaker housing through an opening hole (not shown). That is, according to one embodiment, the multi-way speaker 400 may be manufactured as a hybrid speaker to which a dynamic driver and a balanced armature are applied together.

Referring to FIG. 5, the sound (s1) radiated through the first speaker 410 and the sound (s2) radiated through the second speaker 420 may be simply indicated by arrows. According to one embodiment, the sound (s1) radiated through the first speaker 410 may have a larger radiation area than the sound (s2) radiated through the second speaker 420. The sound (s2) radiated through the second speaker 420 may form a relatively narrow radiation area of the sound (s2), compared to the first speaker 410, and may have high straightness.

The wearable electronic device 300 may include microphone or a plurality of microphones. For example, the wearable electronic device 300 may include a microphone configured to receive an audio signal corresponding to a sound acquired from the inside of the housing 310, and a microphone configured to receive an audio signal corresponding to a sound acquired from the outside of the housing 310. According to one embodiment, the microphone configured to receive an audio signal corresponding to a sound acquired from the inside of the housing 310 may be disposed in the inner space of the housing 310, and the microphone configured to receive an audio signal corresponding to a sound acquired from the outside of the housing 310 may be disposed on the surface of the housing 310. According to one embodiment, a microphone 430 disposed in the inner space of the housing 310 may be referred to as a feedback microphone. The feedback microphone may be used as an "active noise cancellation microphone (ANC) microphone" to perform an ANC function. In the following embodiment, for a microphone included in the wearable electronic device 300, the feedback microphone will be mainly described. The wearable electronic device 300 may include a recess 321 configured to communicate the sound path 312 with the outside. Sounds radiated from the multi-way speaker 400 may be transmitted to the outside (or the user's hearing) through the recess 321. According to one embodiment, the recess 321 may be formed in the grill 320'. The grill 320' may be formed to be seated on and fixed to a seating part (e.g., a groove) 320" of the protrusion 320.

According to various embodiments of the disclosure, the wearable electronic device 300 including the multi-way speaker 400 may provide an "arrangement structure between the multi-way speaker and the microphone" for securing ANC performance by reducing the sound (s2) in a high sound range entering the microphone 430 disposed inside the housing 310.

According to various embodiments of the disclosure, for the structure ("structure between the multi-way speaker and the microphone") for securing ANC performance, according to one embodiment, the microphone 430 may be disposed in front of the first speaker 410 that outputs a sound (s1) in the first sound range. According to another embodiment, the microphone 430 may be positioned in the sound path configured to serve as a path through which a sound output from the first speaker 410 moves, so as to easily receive a sound (s1) output from the first speaker 410.

Referring to FIG. 5, the wearable electronic device 300 according to one embodiment may include a first speaker 410 configured to output a sound (s1) in a first sound range, and a second speaker 420 configured to output a sound (s2) in a second sound range higher than the first sound range, which are provided in the inner space of the housing 310. According to one embodiment, the first speaker 410 may output the sound (s1) in the first sound range in the first direction (e.g., the X axis of FIG. 5). In addition, the second speaker 420 may output the sound (s2) in the second sound range in a direction parallel to the first direction. According to one embodiment, the size of a membrane (or opening hole) of the first speaker 410 (e.g., a woofer) configured to output a sound in a relatively low sound range may be larger than the size of a membrane (or opening hole) of the second speaker 420 (e.g., a tweeter) configured to output a sound in a relatively high sound range. Accordingly, the second speaker 420 having a relatively small size may be disposed outside (e.g., close to the protrusion 320 having the recess 321 formed thereon in FIG. 4 or close to the grill portion having the recess 501 formed thereon in FIG. 13) the wearable electronic device 300, and the first speaker 410 having a relatively large size may be disposed inside (e.g., far from the protrusion 320 having the recess 321 formed thereon in FIG. 4 or far from the grill portion having the recess 501 formed thereon in FIG. 13) the wearable electronic device 300. Therefore, according to various embodiments of the disclosure, the wearable electronic device 300 may be formed such that the distance from the first speaker 410 to the recess 321 for communicating the sound path 312 with the outside is formed to be longer than the distance from the second speaker 420 to the recess 321 for communicating the sound path 312 with the outside. That is, the distance between the first speaker 410 and the recess 321 may be longer than the distance between the second speaker 420 and the recess 321.

As described above, the wearable electronic device 300 may include the multi-way speaker 400, for example, both the first speaker 410 and the second speaker 420 included in the multi-way speaker may operate independently of each other. Accordingly, sounds radiated from the first speaker 410 and the second speaker 420 may also travel independently.

In the wearable electronic device 300 according to one embodiment of the disclosure, the microphone 430 included in the housing 310 may be disposed on a path through which a sound (s1) output from the first speaker 410 moves. According to one embodiment, the sound (s1) output from the first speaker 410 may travel on an identical sound path 312 to a sound (s2) output from the second speaker 420. Considering that the sound (s2) output from the second speaker 420 has high straightness (i.e., relatively low diffraction) due to the relatively high sound range thereof while the sound (s1) output from the first speaker 410 has high diffraction due to the relatively low sound range thereof, the microphone 430 may not be disposed on the path through which the sound (s2) output from the second speaker 420 travels while being disposed on the path of the sound path 312 through which the sound (s1) output from the first speaker 410 travels.

Referring to FIG. 5, based on a direction toward the inside of the wearable electronic device 300, in the inner space (S) of the housing 310, the first speaker 410 may be disposed at a position relatively far from the recess 321, and the second speaker 420 may be disposed at a position relatively close to the recess 321. According to one embodiment, the second speaker 420 may be disposed between the recess 321 and the first speaker 410. In addition, the microphone 430 may be disposed between the recess 321 and the first speaker 410, similarly to the second speaker 420. The microphone 430, when the recess 321 is viewed from above, may be disposed at a position where the same overlaps with the first speaker 410 in the first direction (e.g., the X axis direction) and does not overlap with the second speaker 420 in the first direction (e.g., the X axis direction). In this case, "the recess 321 is viewed from above" may mean that the wearable electronic device 300 is viewed as shown in FIG. 3B. Referring to FIG. 3B and FIG. 5 together, the microphone 430 may be disposed, in the sound path 312, at a position where the same overlaps with the first speaker 410 and does not overlap with the second speaker 420. The "microphone 430 overlaps with the first speaker 410 and does not overlap with the second speaker 420" may mean that the sound-receiving hole of the microphone 430 overlaps with the membrane (or the opening hole) of the first speaker 410 but does not overlap with the membrane (or the opening hole) of the second speaker 420. According to one embodiment, at least a portion of a case of the microphone 430 may be disposed to overlap with the membrane (or the opening hole) of the second speaker 420.

According to various embodiments, the first speaker 410 may include a 1-1th surface 410*a* facing the recess 321, and a 1-2th surface 410*b* facing in the opposite direction to the 1-1th surface. The second speaker 420 may include a 2-1th surface 420*a* facing the recess 321, and a 2-2th surface 420*b* facing in the opposite direction to the 2-1th surface 420*a*. The microphone 430 may include a first surface 430*a* having a sound receiver formed thereon, and a second surface 430*b* having no sound receiver formed thereon and facing in the opposite direction to the first surface 430*a*.

According to various embodiments, the second speaker 420 and the microphone 430 may be disposed in the inner space (S) of the housing between the recess 321 and the 1-1th surface 410*a* of the first speaker 410. In the wearable electronic device 300, the second speaker 420 and the microphone 430 may be disposed in a narrower space between the recess 321 and the first speaker 410, and electronic components other than a speaker and a microphone, for example, an audio signal processor (e.g., 314 of FIG. 4) and a battery (e.g., 315 of FIG. 4) may be disposed in a wide space in a direction of the 1-2th surface 410*b* of the first speaker 410. According to one embodiment, the first speaker 410 may be supported by the housing 310 or a bracket disposed inside the housing and may be connected to an audio signal processor disposed on one side (e.g., the 1-2th surfaces 410*b*) thereof. The second speaker 420 and the microphone 430 may each be supported by a substrate and may be connected using the substrate to the audio signal processor located on the opposite side to the first speaker 410. For example, the second speaker 420 may be mounted on a first substrate 441 extending from one side of the first speaker 410, and the microphone 430 may be mounted on a second substrate 442 extending from the other side of the first speaker 410. According to one embodiment, the first substrate 441 and the second substrate 442 may be formed of a flexible printed circuit board (FPCB).

According to various embodiments, the microphone 430 may be disposed in the sound path 312 while being mounted on the substrate (e.g., the second substrate 442). Referring to FIG. 5, according to one embodiment, the microphone 430 may be floated while being supported only by the substrate (e.g., the second substrate 442) in a hollow portion formed by the sound path 312, but according to another embodiment, the microphone 430 may be disposed to have one side supported on the inner surface 310' of the housing 310 while being mounted on the substrate (e.g., the second substrate 442).

According to various embodiments, a sound receiver capable of receiving a sound radiated from a speaker may be formed on the first surface 430*a* of the microphone 430. The sound receiver, for example, in the embodiment of FIG. 5, may be formed at a position corresponding to the arrow indicated by s3. According to various embodiments of the disclosure, the microphone 430 may be disposed in the sound path 312 such that the first surface 430*a* on which the sound receiver is formed faces the opposite side to a path through which a sound radiated from the second speaker 420 travels, thereby securing ANC performance. For example, when the direction in which a sound radiated from the first speaker 410 travels is referred to as a first direction, the direction in which a sound radiated from the second speaker 420 may be parallel to the first direction. The internal structure of the wearable electronic device 300 as described above may be configured such that the first surface 430*a* (or the sound receiver) of the microphone faces in a direction different from the first direction, and according to one embodiment, faces in a second direction (e.g., the Y axis direction) perpendicular to the first direction and opposite to a path through which a sound (s2) radiated from the second speaker 420 moves. Accordingly, the sound pickup for a sound in a high sound range, radiated from the second speaker 420 and introduced into the sound receiver of the microphone 430, can be reduced, thereby mitigating, reducing or preventing deterioration of the ANC performance, caused by a peak component in an audio signal.

Figure 6A:
FIGS. 6A and 6B are graphs showing an improved speaker-microphone response performance of a wearable electronic device according to an embodiment of the disclosure.
Figure 6B:
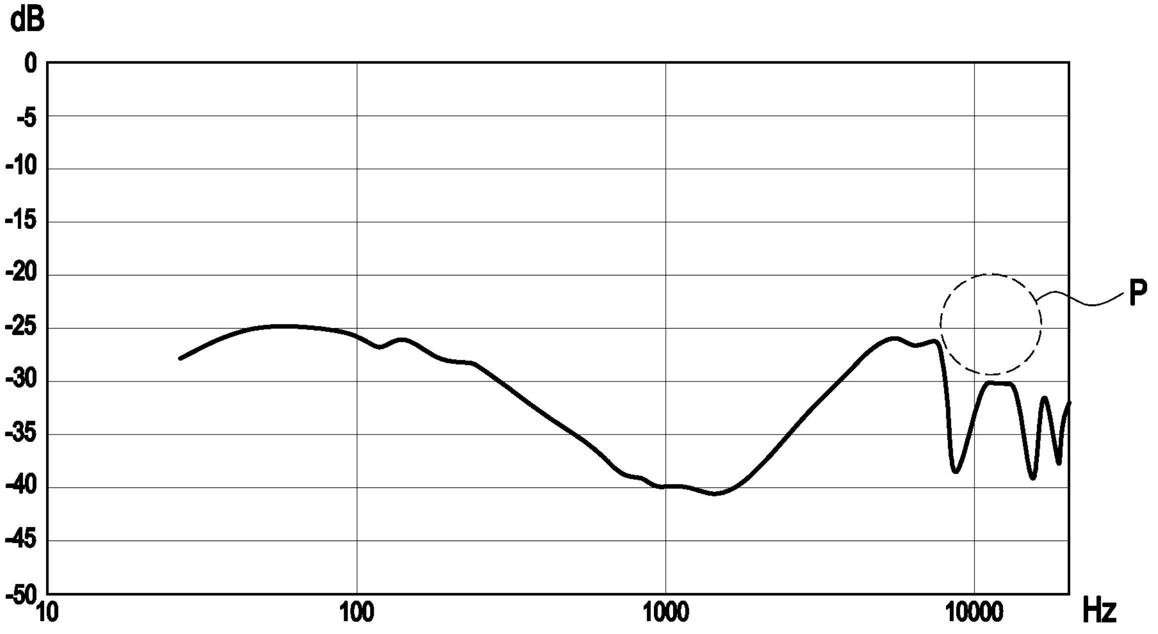

FIGS. 6A and 6B are graphs showing improved ANC performance of a wearable electronic device according to an embodiment of the disclosure.

FIG. 6A is a frequency-response graph of a typical wearable electronic device, and FIG. 6B is a frequency-response graph of a wearable electronic device (e.g., a wearable electronic device of FIG. 5) to which an "arrangement structure between a multi-way speaker and a microphone" for securing ANC performance is applied, according to various embodiments of the disclosure. Here, the vertical axis may indicate the magnitude (dB) of response and the horizontal axis may indicate a frequency (Hz).

Referring to FIGS. 6A and 6B together, in the typical wearable electronic device of the embodiment to which the "arrangement structure between the multi-way speaker and the microphone" for securing the ANC performance is not applied, the peak component (P) may be detected in the high sound range. On the other hand, as noted from the wearable electronic device to which the "arrangement structure between the multi-way speaker and the microphone" for securing the ANC performance is applied, the peak component (P) is not detected and, accordingly the influence over the speaker at high frequencies can be reduced in implementing the active noise cancellation (ANC) function.

Figure 7:
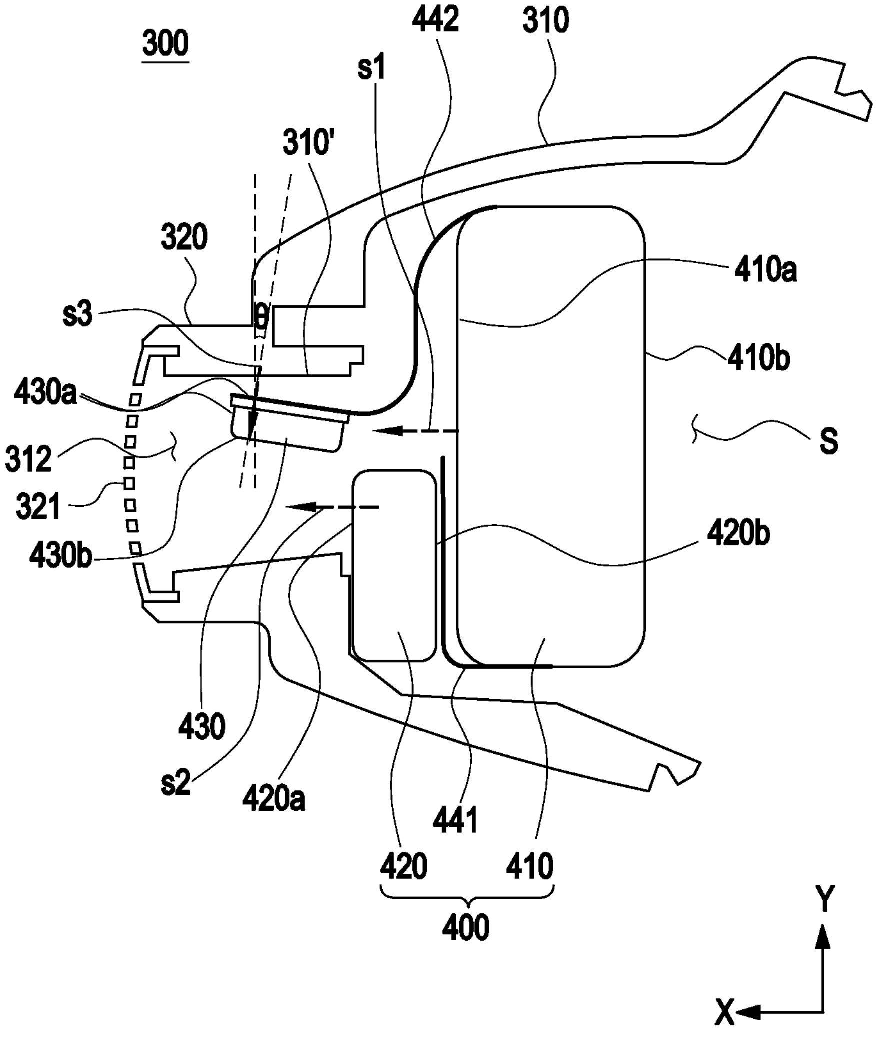
FIG. 7 is a schematic diagram illustrating a cross section of a wearable electronic device in which a multi-way speaker and a microphone are disposed, according to an embodiment of the disclosure.

FIG. 7 is a schematic diagram illustrating a cross section of a wearable electronic device in which a multi-way speaker and a microphone are disposed, according to an embodiment of the disclosure.

The wearable electronic device 300 according to the embodiment referring to FIG. 7 may include substantially the same components as the wearable electronic device 300 according to the embodiment shown in FIG. 5, and the components included in the wearable electronic device 300 according to the embodiment shown in FIG. 7 may have substantially the same functions and arrangements as those included in the wearable electronic device 300 according to the embodiment illustrated in FIG. 5. Accordingly, in the description of the embodiment of FIG. 7, the description overlapping with the embodiment of FIG. 5 will be omitted.

Referring to FIG. 7, a wearable electronic device 300 may include a microphone 430 including a first surface 430*a* having a sound receiver configured to receive a sound, and a second surface 430*b* facing in the opposite direction to the first surface 430*a*. In the embodiment of FIG. 7, the microphone 430 may be disposed in the sound path 312 between the recess 321 and the first speaker 410 such that the first surface 430*a* of the microphone 430 is inclined at a predetermined angle with respect to the sound path 312. In this case, the first surface 430*a* may be inclined such that the sound receiver of the microphone 430 is directed toward the first speaker 410. That is, the direction in which the first surface 430*a* (or the sound receiver) of the microphone 430 faces may be referred to as a third direction which forms a predetermined angle (θ) of 0 degrees or more with respect to the first direction (e.g., the X axis direction) or, as illustrated in FIG. 7, the second direction (e.g., the Y axis). Referring to FIG. 7, the microphone 430 inclined at an angle with respect to the sound path enables a sound signal in a low sound range to be better received by microphone 430 and enables the optimization for the direction of the sound receiver such that a sound signal in a high sound range is not received by the microphone 430.

Figure 8A:
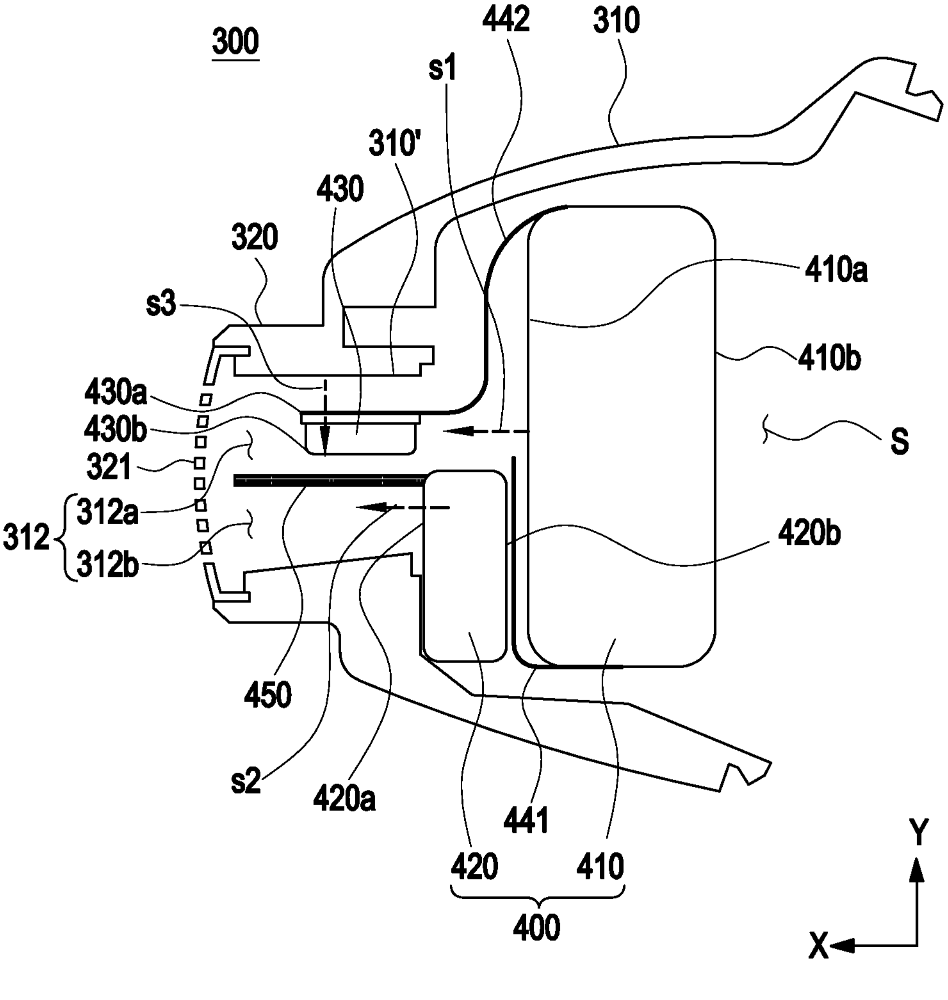
FIG. 8A is a schematic diagram illustrating a cross section of a wearable electronic device in which a multi-way speaker and a microphone are disposed, according to an embodiment of the disclosure.
Figure 8B:
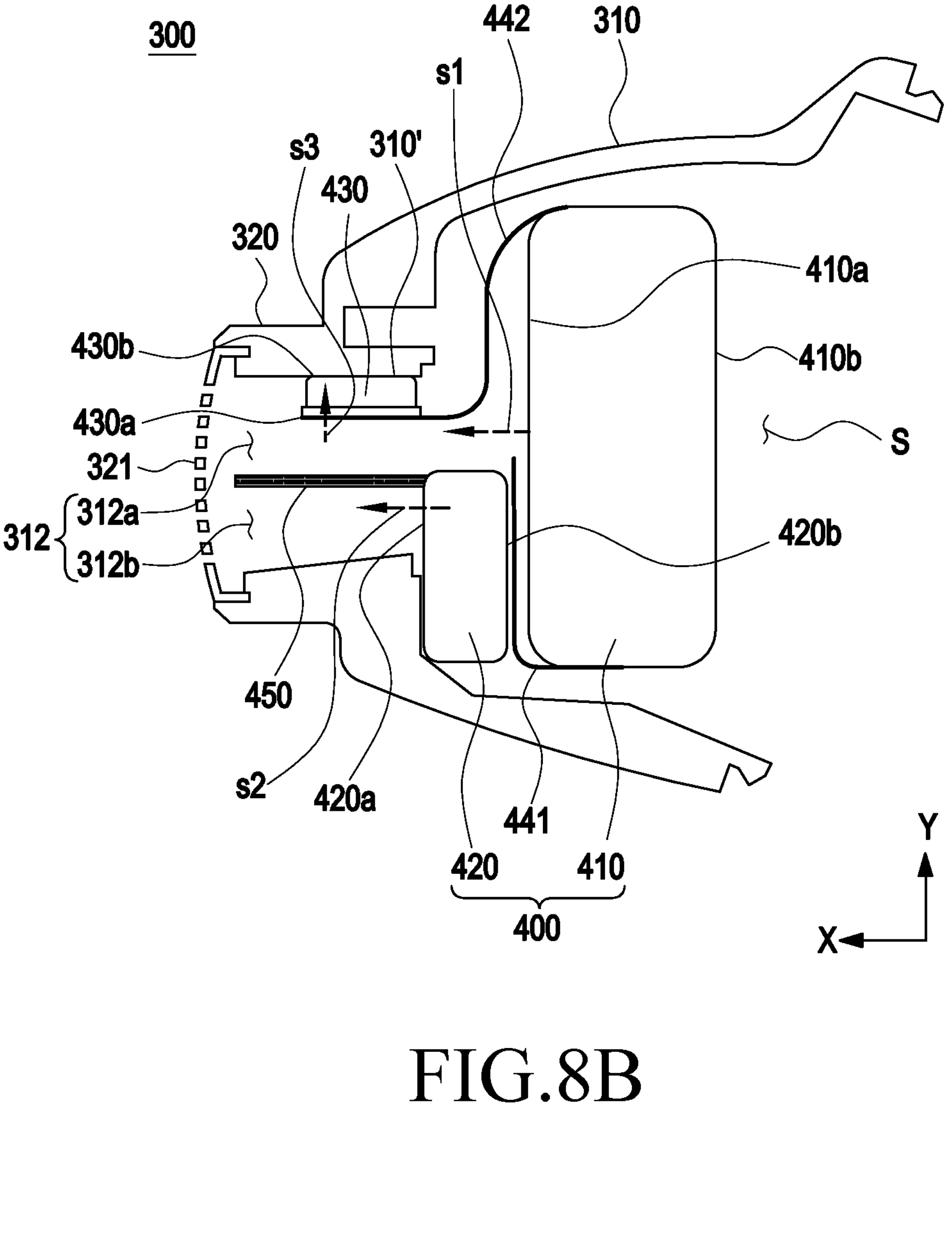
FIG. 8B is a schematic diagram illustrating a cross section of a wearable electronic device in which a multi-way speaker and a microphone are disposed, according to an embodiment of the disclosure.

FIG. 8A is a schematic diagram illustrating a cross section of a wearable electronic device in which the multi-way speaker and the microphone are disposed, according to an embodiment of the disclosure. FIG. 8B is a schematic diagram illustrating a cross section of a wearable electronic device in which a multi-way speaker and a microphone are disposed, according to an embodiment of the disclosure. In the description of the embodiments of FIGS. 8A and 8B, the description overlapping with that of FIG. 5 will be omitted.

Referring to FIGS. 8A and 8B, a housing 310 may further include an inner wall 450 that separates a sound path 312. The sound path 312 may be separated by the inner wall 450 into a first sound path 312*a* serving as a path through which a sound radiated from the first speaker 410 moves, and a second sound path 312*b* serving as a path through which a sound radiated from the second speaker 420 moves.

In this case, the microphone 430 may be disposed in the first sound path 312*a* serving as a path through which a sound radiated from the first speaker 410 moves. According to the embodiment shown in FIG. 8A, the microphone 430 may be disposed in the first sound path 312 such that the first surface 430*a* on which a sound receiver is formed faces in the opposite direction to a path through which a sound radiated from the second speaker 420 moves. For example, the first surface 430*a* (or the sound receiver) of the microphone 430 may face the second direction (e.g., the Y axis direction).

According to the embodiment referring to FIG. 8B, the microphone 430 may also be disposed in the first sound path 312*a* such that the second surface 430*b* on which a sound receiver is not formed is formed adjacent to the inner surface of the housing and the first surface 430*a* faces toward a path through which a sound radiated from the first speaker 410 moves. For example, the first surface 430*a* (or the sound receiver) of the microphone 430 may face a fourth direction (e.g., the opposite direction to the Y axis). When the inner wall 450 is formed in the sound path 312 as shown in FIG. 8B, the influence by the sound radiated from the second speaker 420 may be minimized, whereby the direction toward which the sound receiver of the microphone 430 faces can be designed more freely.

Referring to FIGS. 8A and 8B, a sound signal in a high sound range may not be received by the microphone 430 by installing the inner wall 450 in the sound path and separating the same into a path through which a sound signal in a low sound range travels and a path through which a sound signal in a high sound range moves.

Figure 9:
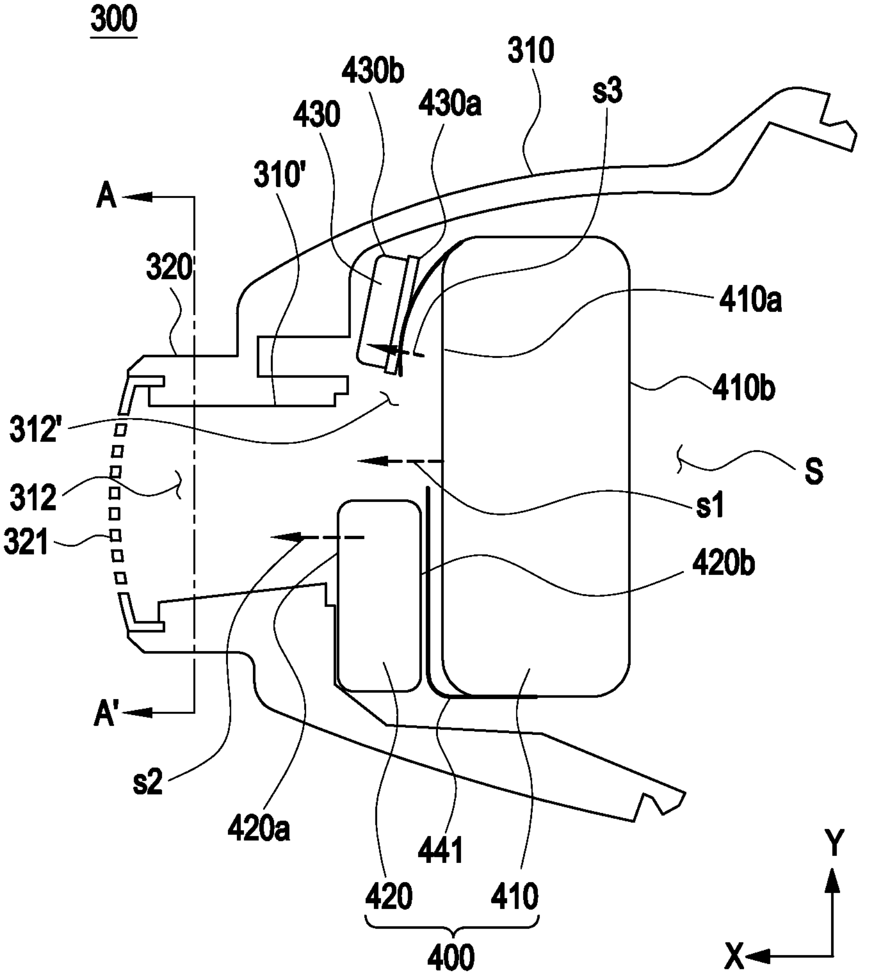
FIG. 9 is a schematic diagram illustrating a cross section of a wearable electronic device in which a multi-way speaker and a microphone are disposed, according to an embodiment of the disclosure.

FIG. 9 is a schematic diagram illustrating a cross section of the wearable electronic device in which a multi-way speaker and a microphone are disposed, according to an embodiment of the disclosure.

In the description of the embodiment of FIG. 9, the description overlapping with embodiment of FIG. 5 will be omitted.

In the embodiments shown in FIGS. 5, 7, 8A, and 8B, the microphone 430 may be disposed closer to the recess 421 than the first speaker 410 and the second speaker 420.

On the other hand, referring to FIG. 9, the microphone 430 may be disposed closer to the recess 421 than the first speaker 410 while being disposed on the same level as the second speaker 420. Here, "component A is disposed on the same level as component B" may mean that, with reference to a certain reference point, component A is disposed closer to the reference point than component B, or conversely, component B is disposed closer to the reference point than component A. In addition, "component A is disposed on the same level as component B" may mean that component A is arranged in parallel with component B in one direction (e.g., the Y axis direction in FIG. 9). In addition, 'component A is disposed on the same level as component B' may mean that at least part of component A is co-planar (i.e., located in the same plane as) at least part of component B; for example, at least part of component A and at least part of component B may be located on a line drawn parallel to the Y axis direction shown in FIG. 9 (corresponding to a plane extending into the page in a Z axis direction perpendicular to both the X axis direction and the Y axis direction; i.e., a Y-Z plane). According to one embodiment, the wearable electronic device 300 may further include a space 312' recessed into the housing 310 to be formed between the sound path 312 and the first speaker 410. When the microphone 430 is positioned in the space 312', the microphone 430 may be disposed at a position overlapping with the second speaker 420 in the second direction (e.g., the Y axis direction).

The microphone 430 in the above-described embodiments (the embodiments shown in FIGS. 5, 7, 8A, and 8B) is disposed in the sound path 312 adjacent to the protrusion 320 and formed by the inner surface 310' of the housing, whereas the microphone 430 in the embodiment shown in FIG. 9 may be disposed in the inner space (S) of the housing 310 to be adjacent to the 1-1th surface 410*a* of the first speaker 410. In addition, the microphone 430 may include a first surface 430*a* on which a sound receiver is formed, and a second surface 430*b* facing in the opposite direction to the first surface 430*a*, and the first surface 430*a* may be arranged to face the first speaker 410 such that a sound (s1) radiated from the first speaker 410 is better received by the microphone 430.

An arrangement structure that prevents a sound signal in a high sound range from being received by the microphone 430 may be provided even when the microphone 430 is disposed on the same level as the second speaker 420 as shown in FIG. 9, and the direction of the sound receiver of the microphone 430 may also be optimized according to circumstances.

Figure 10:
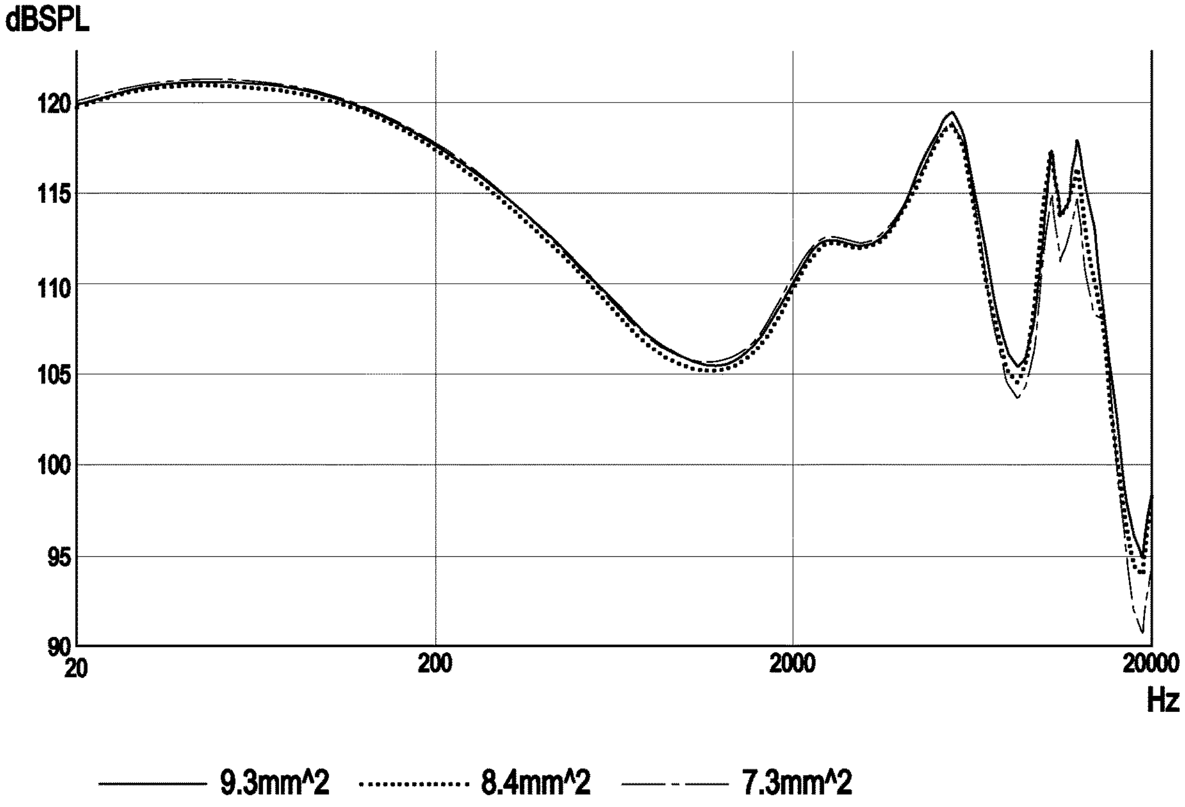
FIG. 10 is a graph showing an improved high sound range characteristic according to an area of a sound radiation hole according to an embodiment of the disclosure.

FIG. 10 is a graph showing an improved high sound range characteristic according to an area of a sound path according to an embodiment of the disclosure. In the graph of FIG. 10, the area of the sound path may represent a cross section of the sound path 312 of FIG. 9, taken along line A-A', the vertical axis may represent the magnitude (decibel sound pressure level (dBSPL)) of response, and the horizontal axis may represent a frequency (Hz).

Referring to FIG. 10, the size of the sound path, for example, 9.3 $mm^2$, for example, 8.5 $mm^2$, and for example, 7.3 $mm^2$ may be indicated by a solid line graph, a dotted line graph, and a dashed-dotted line graph, respectively.

For example, as noted from FIG. 10, the smaller the size of the sound path (9.3 $mm^2$→8.5 $mm^2$→7.3 $mm^2$), the smaller the magnitude of response in the mid-high sound range. As shown in FIG. 9, the microphone 430 which is disposed in the space 312' formed in front of the 1-1th surface 410*a* of the first speaker 410 and recessed into the housing and is disposed in parallel with (overlapping in the second direction (the Y axis direction)) the second speaker 420 results in substantially widening the area of the sound path 312, compared to the embodiment described above in FIGS. 5, 6, 7, 8A, and 8B, and can improve the response characteristic in the mid-high sound range.

According to one embodiment, as mentioned in the embodiment shown in FIGS. 7, 8A, 8B, and 9, the sound quality and the performance may also be improved by optimizing the direction in which the sound receiver of the microphone 430 faces and optimizing the size of the sound path, referenced through FIG. 10.

According to various embodiments of the disclosure, when the ANC function using a feedback microphone is implemented in a wearable electronic device including a multi-way speaker, the arrangement structure between the speaker and the feedback microphone may be optimized to minimize a sound in the high sound range entering the feedback microphone, thereby improving ANC performance.

Figure 11:
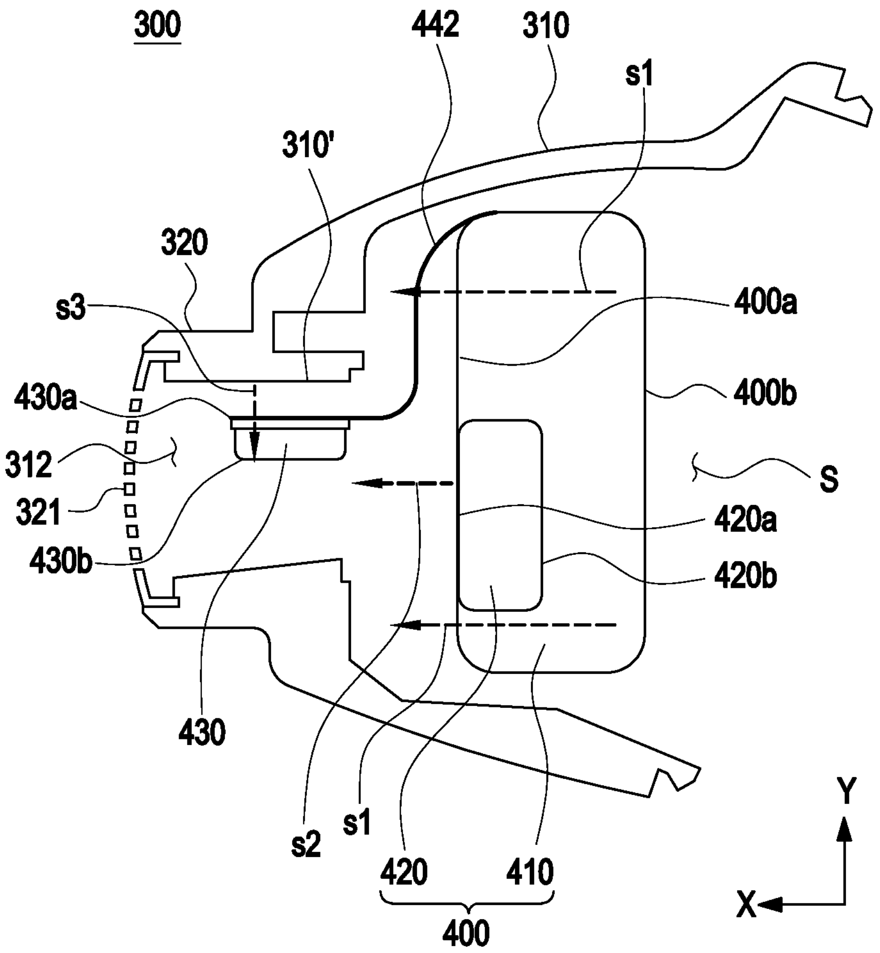
FIG. 11 is a schematic diagram illustrating a cross section of a wearable electronic device in which a multi-way speaker and a microphone are disposed, according to an embodiment of the disclosure.
Figure 12:
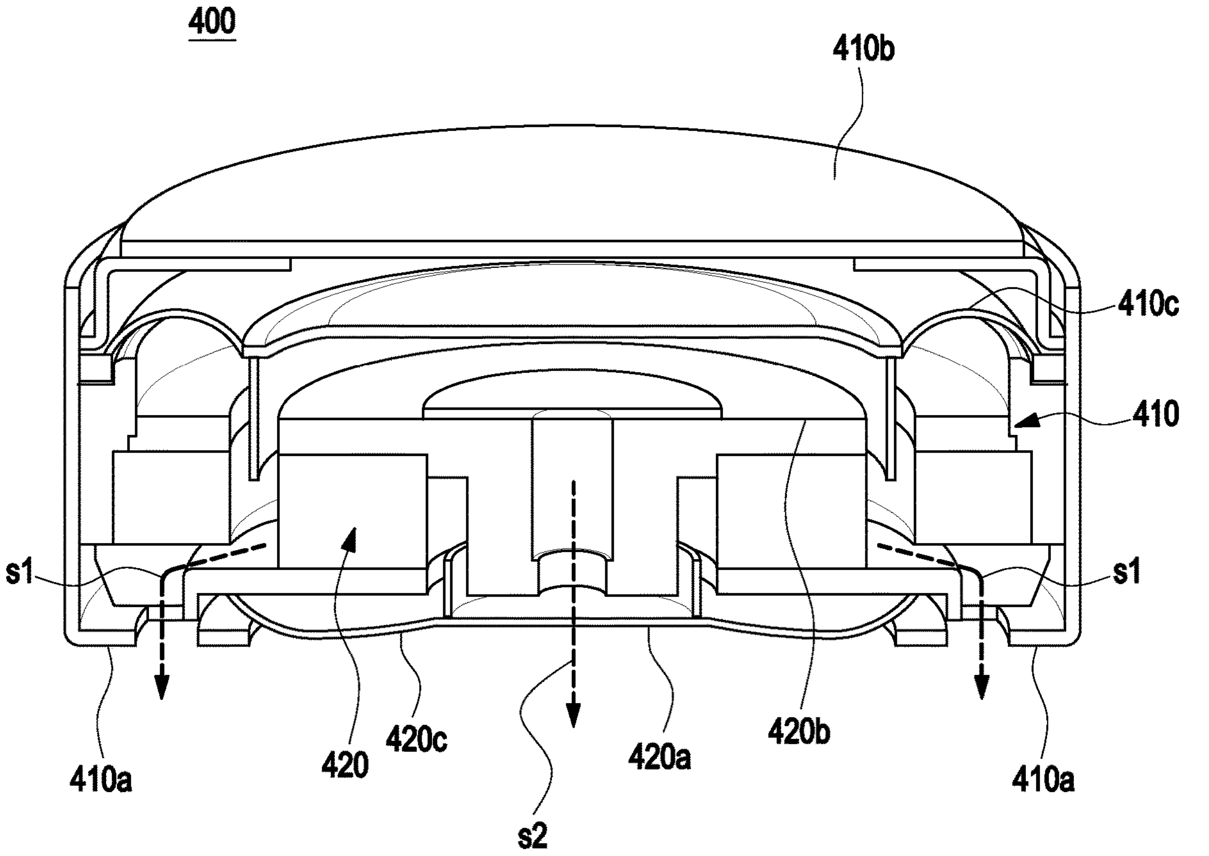
FIG. 12 illustrates a multi-way speaker according to an embodiment of the disclosure.

FIG. 11 is a schematic diagram illustrating a cross section of a wearable electronic device in which a multi-way speaker and a microphone are disposed, according to an embodiment of the disclosure. FIG. 12 illustrates a multi-way speaker according to an embodiment of the disclosure.

In the description of the embodiment shown in FIGS. 11 and 12, the description overlapping with the embodiment of FIG. 5 will be omitted.

The multi-way speaker 400 including two speakers 410 and 420 physically separated from each other is provided in the embodiment shown in FIG. 5, whereas the multi-way speaker 400 including two speakers 410 and 420 which are not physically separated from each other may be provided in the embodiment shown in FIGS. 11 and 12. Hereinafter, the "multi-way speaker 400 including two speakers 410 and 420 which are not physically separated from each other" may be referred to as an "integrated multi-way speaker 400".

According to various embodiments, the first speaker 410 and the second speaker 420 of the integrated multi-way speaker 400 may be disposed in a single speaker body. For example, the integrated multi-way speaker 400 may be formed by receiving the second speaker 420 in the housing of the first speaker 410.

Referring to FIG. 12, an integrated multi-way speaker 400 according to one embodiment may include a first speaker 410 (e.g., a woofer) capable of outputting a sound (s1) in a first sound range, and a second speaker 420 (e.g., a tweeter) capable of outputting a sound (s2) in a second sound range higher than the first sound range, which is disposed inside the body of the first speaker 410. In the case of the integrated multi-way speaker 400 shown in FIG. 12, the second speaker 420 may be positioned in the center of the first speaker 410, and the second speaker 420 may be substantially surrounded by first speaker 410. According to one embodiment, the first speaker 410 may include a 1-1th surface 410*a* and a 1-2th surface 410*b* and may radiate a sound (s1) through the 1-1th surface 410*a*. The second speaker 420 may include a 2-1th surface 420*a* and a 2-2th surface 420*b* and may radiate a sound (s2) through the 2-1th surface 420*a*. The 1-1th surface 410*a* of the first speaker 410 and the 2-1th surface 420*a* of the second speaker 420 may form substantially the same surface, for example, the 1-1th surface 410*a* of the first speaker 410 may surround the 2-1th surface 420*a* of the second speaker 420.

In this case, a first diaphragm 410*c* of the first speaker 410 may be formed at a position closer to the 1-2th surface 410*b* than the 1-1th surface 410*a*, and a second diaphragm 420*c* of the second speaker 420 may formed on the 2-1th surface 420*a*. In the integrated multi-way speaker 400 structure, the sound (s1) output from the first speaker 410 may be radiated in the same direction (e.g., in the X axis direction) as the sound (s2) output from the second speaker 420. In this case, the sound (s1) output from the first speaker 410 may be radiated while having a larger radiation area than the sound (s2) output from the second speaker 420, near the edge of one surface of the integrated multi-way speaker 400.

The embodiment of the integrated multi-way speaker 400 may not necessarily implemented only in the form shown in the drawings (e.g., FIGS. 11 and 12), and other various embodiments may also be applicable. For example, unlike the integrated multi-way speaker 400 shown in the drawing, the first speaker 410 may radiate a sound through the second surface 400*b* of the speaker facing in the opposite direction to the X axis direction, and the second speaker 420 may radiate a sound through the first surface 400*a* of the speaker facing in a direction parallel to the X axis direction. For example, the sound (s1) radiated from the first speaker 410 may also be radiated to the inside of the wearable electronic device 300 through the second surface 400*b* of the first speaker 410 to travel along the inner surface 310' of the housing 310 toward the sound path 312 and recess 321.

According to various embodiments, the microphone 430 may be disposed at various positions capable of receiving the sound (s1) radiated from the first speaker 410. The position of the microphone 430 in the embodiment shown in FIG. 11 is illustrated as being disposed at the same position as that in the embodiment shown in FIG. 5, but is not necessarily limited thereto. For example, the position of the microphone in the embodiment shown in FIGS. 7, 8A, 8B, and 9 may also be applied to that in the embodiment shown in FIG. 11.

Figure 13:
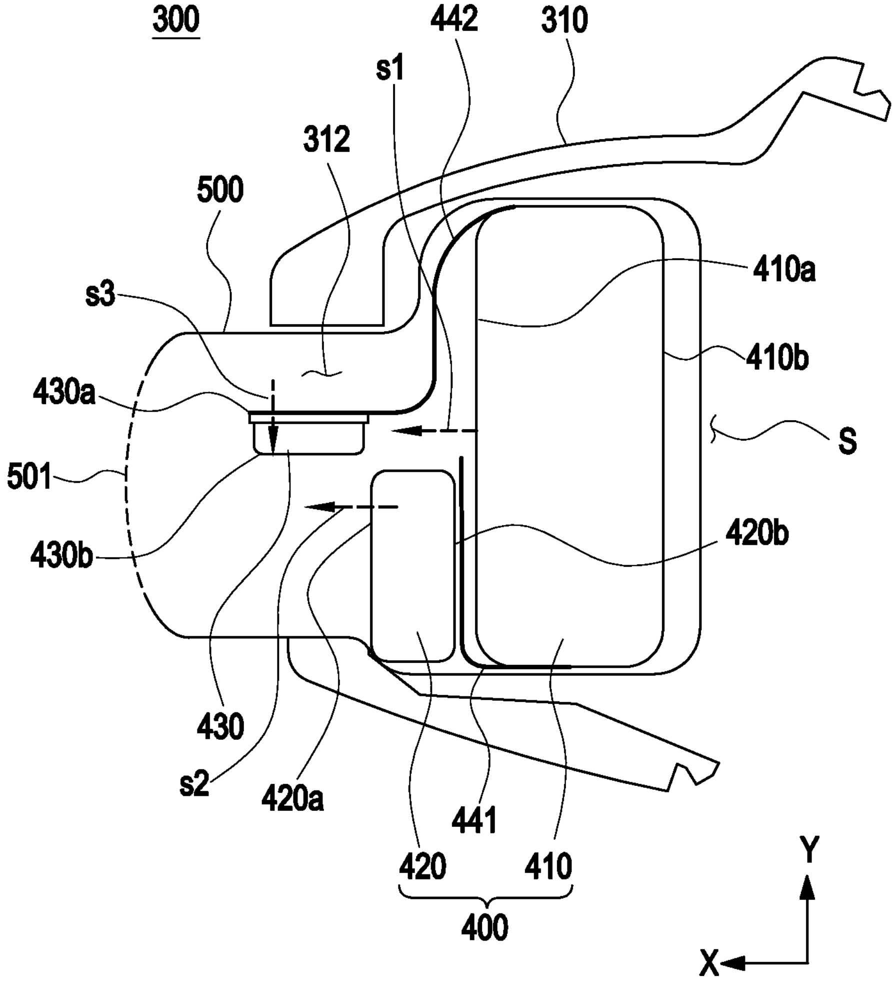
FIG. 13 is a schematic diagram illustrating a cross section of a wearable electronic device in which an audio module is disposed, according to an embodiment of the disclosure.
Figure 14:
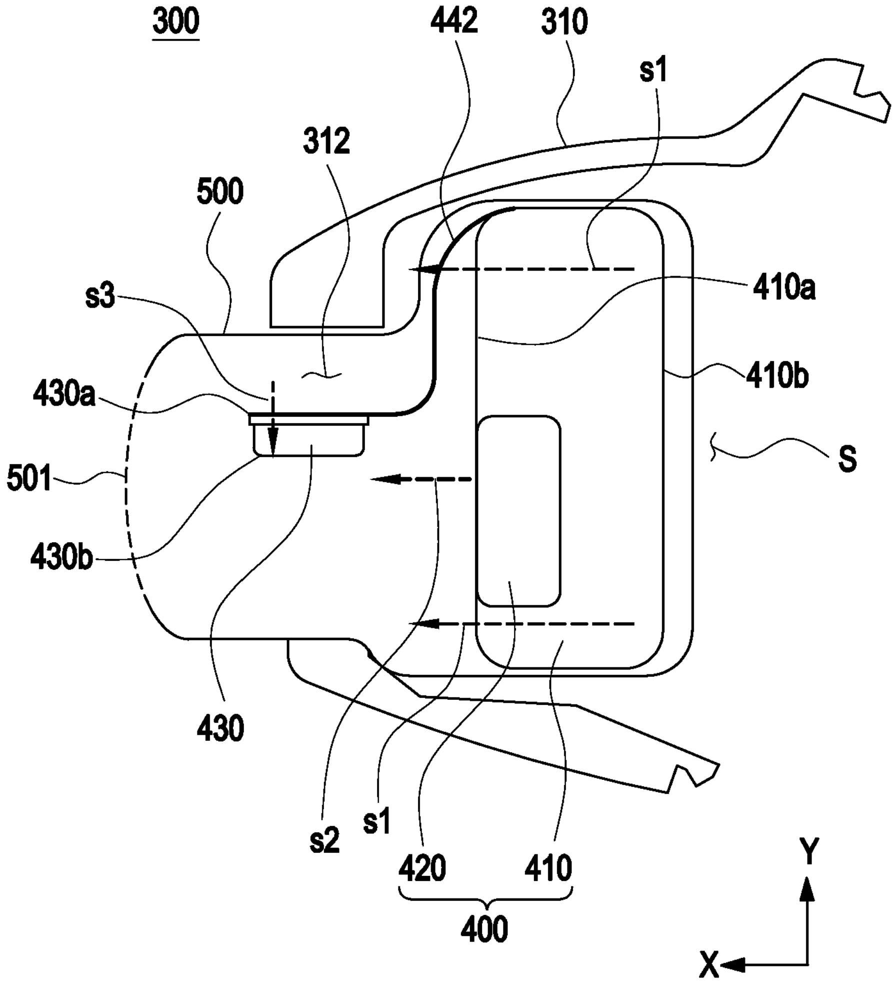
FIG. 14 is a schematic diagram illustrating a cross section of a wearable electronic device in which an audio module is disposed, according to an embodiment of the disclosure.

FIG. 13 is a schematic diagram illustrating a cross section of a wearable electronic device in which an audio module is disposed, according to an embodiment of the disclosure. FIG. 14 is a schematic diagram illustrating a cross section of a wearable electronic device in which an audio module is disposed, according to an embodiment of the disclosure.

FIGS. 13 and 14 may provide the wearable electronic device 300 including an "audio module" formed by modularizing the multi-way speaker 400 and the microphone 430. In the embodiments shown in FIGS. 5, 6, 7, 8A, 8B, 9, 10, and 11, the multi-way speaker 400 and the microphone 430 are provided as a separate component in the housing 310 of the wearable electronic device 300, whereas the embodiments shown in FIGS. 13 and 14 are illustrated that the multi-way speaker 400 and the microphone 430 may be modularized.

The audio module illustrated in FIGS. 13 and 14 may include a first speaker 410, a second speaker 420, and a microphone 430 which are disposed inside an audio housing 500. According to another embodiment, the audio module may be formed such that the audio housing 500 and the grill portion having the recess 501 are integrated with each other.

Referring to FIGS. 13 and 14, the seating structure for stably placing the grill portion on the protrusion of the wearable electronic device may be removed by integrally forming the grill portion with the audio housing 500. The part resulting therefrom may be secured as an area of the sound path. When the area of the sound path is secured, as described above in the frequency response change graph according to the area of a radiation hole of FIG. 10, the mid-high sound range characteristics of the speaker can be secured. In addition, the wearable electronic device to which the modularized multi-way speaker 400 and microphone 430 is applied can reduce the size of the protrusion of the wearable electronic device for the same area, compared to the wearable electronic device to which the non-modularized multi-way speaker 400 and microphone 430 is applied, thereby improving the wearing comfort.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, a sound range of a speaker refers to a frequency response range. The terms 'sound range' and 'frequency range' may be used interchangeably in describing various embodiments of the present disclosure. For example, if a first speaker 410 is associated with a first sound range and a second speaker 420 is associated with a second sound range different to the first sound range, then a frequency response range of the first speaker 410 is different to a frequency response range of the second speaker 420. In an example, this means that no part of the frequency response range of the first speaker 410 may overlap with the frequency response range of the second speaker 420. In another example, the frequency response range of the first speaker 410 may partially overlap with the frequency response range of the second speaker 420, however the entire frequency response range of one speaker is not included in the frequency response range of the other speaker. In another example, it may be said that one sound range includes one or more frequency values which are not included in the other sound range. It will be appreciated how the frequency of a sound output by a speaker may be associated with the path of the sound as it moves after being output.

According to various embodiments, the microphone 430 is disposed in a space between the recess 321 and the first speaker 410. Furthermore, the microphone 430 is disposed so as to avoid the sound path of the second speaker 420. For example, the microphone 430 may be disposed outside the sound path of the second speaker 420 or may be disposed such that relatively little audio signal (e.g., sound) emitted by the second speaker 420 reaches the microphone 430. According to various embodiments, the sound path of the second speaker 420 may be conceptually regarded as a cone extending from the second speaker 420 (for example, extending from an output region, a membrane, a diaphragm, an audio source etc. of the second speaker 420) towards the recess 321. The size or spread of the cone may correspond to spreading-out, or diffraction, of the audio from the second speaker 420. In an embodiment of the disclosure, the microphone 430 may be disposed in a space between the recess 321 and the first speaker 410 so as to be outside of the cone or substantially outside of the cone (so as to reduce sound being received from the second speaker 420). In an embodiment of the disclosure, the microphone 430 may be arranged such that a sound receiver of the microphone 430 is positioned to face away from the cone as it extends from the second speaker 420. Of course, it will be appreciated that the sound path may not be precisely conical, or may correspond to a different shape depending on the properties of the second speaker 420 and/or the structure of the space between the second speaker 420 and the recess 321.

Various embodiments of the disclosure may provide a wearable electronic device including: a first speaker configured to radiate a sound in a first sound range; a second speaker configured to radiate a sound in a second sound range higher than the first sound range; a microphone; and a housing configured to accommodate the first speaker, the second speaker, and the microphone therein. The housing may include: a sound path configured to serve as a path through which sounds radiated from the first speaker and the second speaker move; and a recess configured to communicate the sound path with the outside of the housing. The microphone may be disposed at a position where, when the recess is viewed from above, the same overlaps with the first speaker in a first direction and does not overlap with the second speaker in the first direction. For example, viewing the recess from above may refer to viewing along the first direction (looking through the recess in to the housing), and the sound path may extend in the first direction from the first speaker and the second speaker.

According to various embodiments, the second speaker may be disposed between the recess and the first speaker.

According to various embodiments, the microphone may include a first surface on which a sound receiver configured to receive a sound is formed, and a second surface facing in the opposite direction to the first surface, and the first surface may face in a second direction perpendicular to the longitudinal direction of the sound path such that the first surface does not face toward a main path (e.g., a path (S2) in FIG. 5) through which a sound radiated from the second speaker moves.

According to various embodiments, the microphone may include a first surface on which a sound receiver configured to receive a sound is formed, and a second surface facing in the opposite direction to the first surface, and the first surface may face in a third direction inclined at a predetermined angle with respect to the sound path, while not facing toward a main path (S2) through which a sound radiated from the second speaker moves.

According to various embodiments, the microphone may be inclined at a predetermined angle such that the sound receiver is directed toward the first speaker.

According to various embodiments, the housing may include an inner wall that separates the sound path, and the sound path may include a first sound path configured to serve as a path through which a sound radiated from the first speaker moves, and a second sound path configured to serve as a path through which a sound radiated from the second speaker moves.

According to various embodiments, the microphone may be disposed in the first sound path.

According to various embodiments, the microphone may include a first surface on which a sound receiver configured to receive a sound is formed, and a second surface facing in the opposite direction to the first surface, and the first surface may face in a direction perpendicular to the longitudinal direction of the sound path and the second surface may be formed adjacent to an inner surface of the housing.

According to various embodiments, the sound receiver of the microphone may be disposed to face toward a path through which a sound radiated from the first speaker moves.

According to various embodiments, the microphone may be disposed on an identical level as the second speaker when the wearable electronic device is viewed from the side.

According to various embodiments, when the wearable electronic device is viewed from the side, the microphone may face in the second direction perpendicular to the longitudinal direction of the sound path and the second speaker such that the same does not face toward a main path (e.g., a path (S2) in FIG. 5) through which a sound radiated from the second speaker moves.

According to various embodiments, the microphone may be disposed such that a sound receiver configured to receive a sound faces the first speaker.

According to various embodiments, the microphone may be disposed in a space between the sound path and the first speaker and may be disposed to overlap with the first speaker in the first direction.

According to various embodiments, the microphone may be a microphone configured to perform an active noise cancellation (ANC) function.

According to various embodiments, electronic components including an audio signal processor and a battery may be disposed in the inner space of the housing.

According to various embodiments, the second speaker may be connected by a first substrate extending from a first side surface of the first speaker.

According to various embodiments, the microphone may be connected by a second substrate extending from a second side surface of the first speaker.

According to various embodiments, the second speaker and the microphone may be mounted by flexible printed circuit boards (FPCB) extending from one side and the other side of the first speaker, respectively.

Various embodiments of the disclosure may provide a wearable electronic device including: a first speaker configured to radiate a sound in a first sound range in a first direction; a second speaker configured to radiate a sound in a second sound range higher than the first sound range in a direction parallel to the first direction; a microphone; and a housing configured to accommodate the first speaker, the second speaker, and the microphone therein. The housing may include: a sound path extending in the first direction, the sound path serving as a path through which sounds radiated from the first speaker and the second speaker move; and a recess configured to communicate the sound path with the outside of the housing. The microphone may be disposed in the sound path, and a sound receiver of the microphone may be formed to face in a direction different from the first direction.

According to various embodiments, the microphone may face in the second direction perpendicular to the first direction and opposite to the direction of a main path (e.g., a path (S2) in FIG. 5) through which a sound radiated from the second speaker moves.

According to various embodiments, the microphone may face in a third direction inclined at a predetermined angle with respect to the sound path, while facing in the opposite direction to a main path (e.g., the path (S2) in FIG. 5) through which a sound radiated from the second speaker moves.

According to various embodiments, the housing may include an inner wall that separates the sound path, the sound path may include a first sound path configured to serve as a path through which a sound radiated from the first speaker moves, and a second sound path configured to sever as a path through a sound radiated from the second speaker moves, and the microphone may be disposed in the first sound path.

According to various embodiments, the second speaker may be disposed between the recess and the first speaker, and the microphone may be disposed on the same level as the second speaker when the wearable electronic device is viewed from the side.

According to various embodiments, the recess may be integrally formed as a part of the audio housing, and the first speaker, the second speaker, and the microphone may be disposed inside the audio housing.

Various embodiments of the disclosure may provide an electronic device comprising: a first speaker configured to output a sound in a first frequency range; a second speaker configured to output a sound in a second frequency range, wherein the second frequency range includes one or more frequencies higher than any frequency included in the first frequency range; a microphone; a housing configured to accommodate the first speaker, the second speaker and, at least partly, the microphone; and an opening configured to output sound from at least one of the first speaker or the second speaker to outside of the electronic device; wherein at least part of the microphone is disposed at a position outside of a sound path of the second speaker and/or to face away from the sound path of the second speaker, the sound path of the second speaker extending from the second speaker to the opening.

According to various embodiments, wherein the microphone includes a sound receiver configured to receive a sound, and the sound receiver is disposed at a position outside the sound path of the second speaker and/or to face away from the sound path of the second speaker.

According to various embodiments, wherein the microphone comprises a first surface on which a sound receiver configured to receive a sound is formed, and a second surface facing in the opposite direction to the first surface, wherein the first surface faces in a first direction perpendicular to the longitudinal direction of the sound path of the second speaker and/or faces away from the sound path of the second speaker.

According to various embodiments, wherein the sound receiver is disposed to face away from the sound path of the second speaker, such that sound output by the second speaker is not directly input to the sound receiver.

According to various embodiments, wherein the sound receiver is inclined at a predetermined angle towards the first speaker (such that detection/reception, by the sound receiver, of sound output by the first speaker is increased).

According to various embodiments, when dependent on clause 2*b*, wherein the first surface faces in a second direction inclined at a predetermined angle with respect to a sound path of the first speaker, while not facing toward the sound path of the second speaker.

According to various embodiments, the electronic device comprising a wall configured to separate the sound path of the second speaker and a sound path of the first speaker.

According to various embodiments, wherein the microphone is disposed in the sound path of the first speaker.

According to various embodiments, wherein the microphone comprises a first surface on which a sound receiver configured to receive a sound is formed, and a second surface facing in the opposite direction to the first surface, wherein the first surface faces in a direction perpendicular to the longitudinal direction of the sound path of the second speaker and/or the sound path of the first speaker, and/or the first surface faces the sound path of the first speaker, and wherein the second surface is formed adjacent to an inner surface of the housing.

According to various embodiments, wherein, when the electronic device is viewed from the side, the microphone is disposed to overlap with the second speaker in the second direction perpendicular to the longitudinal direction of the sound path of the second speaker (such that the microphone does not face toward a path through which a sound radiated from the second speaker moves).

According to various embodiments, wherein a part of the microphone is coplanar with a part of the second speaker in a plane perpendicular to the sound path of the second speaker.

According to various embodiments, wherein at least part of the microphone is disposed in the sound path of the first speaker.

According to various embodiments, wherein the microphone is configured to perform an active noise cancellation (ANC) function.

According to various embodiments, wherein electronic components comprising at least one of an audio signal processor or a battery are disposed within the housing.

According to various embodiments, wherein the second speaker is connected by a first substrate extending from a first side surface of the first speaker, or wherein the first speaker and the second speaker are integrated in a multi-way speaker.

According to various embodiments, wherein the second speaker is disposed inside a body of the first speaker; optionally, the second speaker may be positioned in the center of the first speaker.

According to various embodiments, wherein the microphone is connected by a second substrate extending from a second side surface of the first speaker.

According to various embodiments, wherein the second speaker and the microphone are mounted by flexible circuit boards (FPCBs) extending from one side and the other side of the first speaker, respectively According to various embodiments, wherein the electronic device is a wearable electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

Unless defined otherwise, all terms used herein, including technical or scientific terms, have the same meaning as commonly understood by those of ordinary skill in the art to which this disclosure belongs. Terms such as those commonly used and defined in a dictionary should be interpreted as having a meaning consistent with the meaning in the context of the related art and should not be ideally or excessively interpreted as a formal meaning unless explicitly defined.

BRIEF DESCRIPTION OF REFERENCE NUMERALS

101: Electronic device
300: Wearable electronic device
310: Housing
311: Speaker
312: Sound path
313: Microphone
320: Protrusion
321: Recess
400: Multi-way speaker
410: First speaker
420: Second speaker
430: Feedback microphone

The invention claimed is:

1. A wearable electronic device comprising:
a first speaker configured to radiate a sound in a first frequency range;
a second speaker configured to radiate a sound in a second frequency range higher than the first frequency range;
a microphone;
a housing configured to:
accommodate the first speaker, the second speaker, and the microphone therein, the housing comprising a sound path extending in a first direction, and
serve as a path through which sounds radiated from the first speaker and the second speaker move; and
a recess configured to communicate the sound path with an outside of the housing,
wherein the microphone is disposed at a position where, when the recess is viewed from above, the microphone overlaps with the first speaker in the first direction and does not overlap with the second speaker in the first direction,
wherein the microphone is located closer to a protrusion of the recess than the second speaker, and
wherein the second speaker is disposed between the recess and the first speaker.

2. The wearable electronic device of claim 1,
wherein the microphone comprises a first surface on which a sound receiver configured to receive a sound is formed, and a second surface facing in the opposite direction to the first surface, and
wherein the first surface faces in a second direction perpendicular to a longitudinal direction of the sound path such that the first surface does not face toward a path through which a sound radiated from the second speaker moves.

3. The wearable electronic device of claim 1,
wherein the microphone comprises a first surface on which a sound receiver configured to receive a sound is formed, and a second surface facing in the opposite direction to the first surface, and
wherein the first surface faces in a third direction inclined at a predetermined angle with respect to the sound path, while not facing toward a path through which a sound radiated from the second speaker moves.

4. The wearable electronic device of claim 1,
wherein the housing comprises an inner wall configured to separate the sound path, and
wherein the sound path comprises:
a first sound path configured to serve as a path through which a sound radiated from the first speaker moves, and
a second sound path configured to serve as a path through which a sound radiated from the second speaker moves.

5. The wearable electronic device of claim 4, wherein the microphone is disposed in the first sound path.

6. The wearable electronic device of claim 5,
wherein the microphone comprises a first surface on which a sound receiver configured to receive a sound is formed, and a second surface facing in the opposite direction to the first surface, wherein the first surface faces in a direction perpendicular to a longitudinal direction of the sound path, and wherein the second surface is formed adjacent to an inner surface of the housing.

7. The wearable electronic device of claim 6, wherein the sound receiver of the microphone is disposed to face toward a path through which a sound radiated from the first speaker moves.

8. The wearable electronic device of claim 1, wherein, when the wearable electronic device is viewed from a side, the microphone is disposed to overlap with the second speaker in a second direction perpendicular to a longitudinal direction of the sound path such that the microphone does not face toward a path through which a sound radiated from the second speaker moves.

9. The wearable electronic device of claim 1, wherein the microphone is disposed in a space between the sound path and the first speaker, and wherein the microphone is disposed to overlap with the first speaker in the first direction.

10. The wearable electronic device of claim 1, wherein the microphone is a microphone configured to perform an active noise cancellation (ANC) function.

11. The wearable electronic device of claim 1, wherein electronic components comprising an audio signal processor and a battery are disposed in an inner space of the housing.

12. The wearable electronic device of claim 1, wherein the second speaker is connected by a first substrate extending from a first side surface of the first speaker.

13. The wearable electronic device of claim 1, wherein the microphone is connected by a second substrate extending from a second side surface of the first speaker.

14. The wearable electronic device of claim 1, wherein the second speaker and the microphone are mounted by flexible printed circuit boards (FPCBs) extending from one side and the other side of the first speaker, respectively.

15. The wearable electronic device of claim 1, wherein the sound path includes a first sound path which the sound radiated from the first speaker move and a second sound path which the sound radiated from the second speaker move, and wherein, when the recess is viewed along the first direction, the microphone is arranged to overlap with the first speaker in the first direction and disposed in the first sound path, and the microphone is not arranged to overlap with the second speaker in the first direction and not disposed in the second sound path.

16. A wearable electronic device comprising:

a first speaker configured to radiate a sound in a first frequency range in a first direction;

a second speaker configured to radiate a sound in a second frequency range higher than the first frequency range in a direction parallel to the first direction;

a microphone;

a housing configured to:

accommodate the first speaker, the second speaker, and the microphone therein, the housing comprising a sound path extending in the first direction, and serve as a path through which sounds radiated from the first speaker and the second speaker move; and a recess configured to communicate the sound path with an outside of the housing, wherein the microphone is disposed in the sound path, wherein a sound receiver of the microphone is formed to face in a direction different from the first direction, wherein the microphone is located closer to a protrusion of the recess than the second speaker, and wherein the second speaker is disposed between the recess and the first speaker.

17. The wearable electronic device of claim 16, wherein the microphone faces in a second direction perpendicular to the first direction and opposite to the direction of a path through which a sound radiated from the second speaker moves.

18. The wearable electronic device of claim 16, wherein the microphone faces in a third direction inclined at a predetermined angle with respect to the sound path, while facing in the opposite direction to a path through which a sound radiated from the second speaker moves.

19. The wearable electronic device of claim 16, wherein the housing comprises an inner wall configured to separate the sound path, wherein the sound path comprises:

a first sound path configured to serve as a path through which a sound radiated from the first speaker moves, and a second sound path configured to serve as a path through which a sound radiated from the second speaker moves, and wherein the microphone is disposed in the first sound path.

20. The wearable electronic device of claim 16, wherein the microphone is disposed on an identical level to the second speaker when the wearable electronic device is viewed from a side.

21. The wearable electronic device of claim 16, wherein the second speaker is supported by a first substrate extending from a first side of the first speaker.

22. The wearable electronic device of claim 16, wherein the microphone is supported by a second substrate extending from a second side of the first speaker.

23. The wearable electronic device of claim 16, wherein a mounting structure of the microphone minimizes influence from high-sound-range characteristics of the first speaker.

* * * * *